US012079263B2

(12) United States Patent
Craft

(10) Patent No.: US 12,079,263 B2
(45) Date of Patent: Sep. 3, 2024

(54) VIRTUAL REPOSITORY WITH MEDIA IDENTIFICATION AND MATCHING

(71) Applicant: Mack Craft, Denver, CO (US)

(72) Inventor: Mack Craft, Denver, CO (US)

(*) Notice: Subject to any disclaimer, the term of this patent is extended or adjusted under 35 U.S.C. 154(b) by 0 days.

(21) Appl. No.: 18/051,273

(22) Filed: Oct. 31, 2022

(65) Prior Publication Data

US 2023/0083893 A1 Mar. 16, 2023

Related U.S. Application Data

(63) Continuation-in-part of application No. 17/248,185, filed on Jan. 13, 2021, now Pat. No. 11,526,472.

(51) Int. Cl.
*G06F 16/43* (2019.01)
(52) U.S. Cl.
CPC .................... *G06F 16/43* (2019.01)
(58) Field of Classification Search
CPC ....................................................... G06F 16/43
See application file for complete search history.

(56) References Cited

U.S. PATENT DOCUMENTS

| 9,794,067 B2* | 10/2017 | Voloshynovskiy ... H04L 9/0866 |
| 10,505,726 B1* | 12/2019 | Andon ............... G06Q 30/0643 |
| 2014/0236988 A1* | 8/2014 | Harron .................. G06F 16/783 707/769 |
| 2015/0093017 A1* | 4/2015 | Hefeeda ............. G06F 16/7847 382/154 |
| 2015/0271558 A1* | 9/2015 | Pomeroy .......... H04N 21/42201 725/13 |
| 2019/0287152 A1* | 9/2019 | Adoni ................ G06Q 30/0631 |
| 2019/0373309 A1* | 12/2019 | Fahnestock ........ H04N 21/8358 |

OTHER PUBLICATIONS

Vandecasteele et al. "Spatio-temporal wardrobe generation of actors' clothing in video content," Human-Computer Interaction, Novel User Experiences: 18th International Conference, HCI International 2016, Toronto, ON, Canada, Jul. 17-22, 2016. (Year: 2016).*

* cited by examiner

*Primary Examiner* — Jay A Morrison
(74) *Attorney, Agent, or Firm* — Mark Young, PA

(57) ABSTRACT

A computer-implemented method of object linking from captured media records media (audio or video) from a scene of a program (e.g., TV show, movie or other similar audio visual content), identifies the program and the program scene from a watermark embedded in the captured media or by fingerprinting the captured media and matching the fingerprint to determined fingerprints in a database that relates determined fingerprints to programs and program scenes, determines participants in scene from a participant database that relates participants to programs and program scenes, generates links to objects and online commerce sites offering the linked objects. Records for the objects are contained in a virtual repository, a database that relates users (e.g., participants) to object records.

20 Claims, 10 Drawing Sheets

VIRTUAL REPOSITORY WITH MEDIA IDENTIFICATION AND MATCHING

RELATED APPLICATION

This application is a continuation in part and claims the benefit of priority of nonprovisional of U.S. Nonprovisional application Ser. No. 17/248,185 filed Jan. 13, 2021, which claims the benefit of priority of U.S. Provisional Application 62/974,091 filed Nov. 13, 2019, the entire contents of which are incorporated herein by this reference and made a part hereof.

FIELD OF THE INVENTION

This invention relates to a system that generates triggers that identify a user and targeted program, processes the triggers to determine one or more item records from a virtual repository that are related to the program, generates a list of links to item records and provides purchasing options for each item.

BACKGROUND

Celebrities influence the consuming public. Fans may want to dress like celebrities, wear the same jewelry, consume the same foods, and beverages, enjoy the same furniture, drive the same vehicles. Heretofore, consumers had to conduct their own research to find out what a celebrity wore, drove, consumed or used on a show, at an event or in a movie. While corporate sponsors have paid considerable sums to movie producers to have their brand blatantly highlighted in a scene, the exposure was limited and often considered tacky. The sponsored product appeared briefly in a few scenes. Unsponsored products were wholly ignored.

Some consumers want to know what a celebrity wore, drove, consumed or used on a show, at an event or in a movie. What appeals to some consumers may not appeal to others. It is difficult or impossible to predict what may catch a consumer's eye. One consumer may adore a watch worn by a celebrity in scene. Another may fancy a garment. Another may desire a vehicle. However, there is no convenient way to make this information available to consumers, and, heretofore, no motivation for a celebrity or producer to go through the effort.

Financing is constant challenge for celebrities and producers. A good production can be costly. Heretofore, production companies and investors with considerable resources financed the production and marketing of movies. The majority of their financial return came from movie tickets, sales or rental of copies, licensed rights for broadcast and on-demand offerings, and, occasionally, merchandising of brands made popular by the production. Heretofore there was no way for producers to effectively capitalize on the popularity of a product due to the movie.

The status quo does not inspire sellers. Products supplied or sold for use by a celebrity are a one time sale by the seller. Occasionally, a dress designer will receive publicity on the red carpet when a celebrity mentions the brand. The dresses and brands are impractical and too expensive for ordinary consumers. If sellers had assurance that their products would be marketed to consumers via the show, event or movie, they would not only be willing to supply the products for free but may also offer a portion of sales proceeds derived from such marketing.

A system and method that efficiently identifies items worn and used in a show, event or movie, and facilitates sales of such items is needed. A system and method that helps individuals such as celebrities and businesses such as production companies manage, promote and commercialize their wardrobes, props and the like, is also needed. A system and method that enables consumers to readily identify items from a show, event or movie, and facilitates purchasing transactions for the original item and/or commercially available items of the same kind is also needed.

The invention is directed to overcoming one or more of the problems and solving one or more of the needs as set forth above.

SUMMARY OF THE INVENTION

To solve one or more of the problems set forth above, in an exemplary implementation of the invention, a computer-implemented method of managing a virtual repository system includes providing on a computing system a plurality of virtual repositories. Each virtual repository is assigned to a user. Each virtual repository includes item records for items owned and used or managed by the user.

Using an application on a portable computing device, such as a smartphone, a consumer selects a trigger. The exemplary method accepts various triggers. A target trigger requests information associated with at least one virtual repository of the plurality of virtual repositories assigned to an identified user. An event trigger requests virtual repository information for one or more users appearing at a scheduled event. A location trigger requests information for one or more users at the same location (which includes the vicinity) as the location of the first user who submitted the trigger. A media trigger contains an image, video, video trigger, or sound recording, from which a user's identity is determined via facial or speaker recognition. A product trigger identifies a product and seeks links to users and/or virtual repositories that contain item records that corresponds to the product. A directive trigger includes a condition, which, when satisfied, causes the computing system to send results that include responsive details. A video trigger includes a media trigger, captured media, and may include image recognition technology to identify a television, video, or a theater screen when initiated. When initiated, cropping of the television, video, or theater screen may begin to filter out everything outside the program itself to prevent incorrect fingerprinting. In all cases, displayed results may be filtered and sorted by the user. The trigger creates a percipient sample pack (PSP). The PSP may include a user identification, location information, time information and captured media. Thus, the PSP contains information and captured media. The user identification, location information, time information are PSP information. The captured media is PSP media. The captured media is recorded audio and/or video of a target. The target is a television program (e.g., a show or movie, TV commercial, music video), a streamed program, or a program from another source, such as a recording medium (e.g., a DVD), the Internet or a program delivery service that provides content by network communication. The captured media is a portion of the target, i.e., a portion of interest to the user. The user may be interested in the participants who appear in the captured media, the garments or accessories they are wearing, items they are using or other objects or objects related to services (e.g. make-up the participant is wearing and the make-up artist who put it on the participant and option or link to schedule an appointment) that appear in the captured media (e.g., furniture, dishware, art, pets, bed, lamp, event information. Services in captured media may also include, but not limited to buildings with leasing options or purchasing options to office space, residential space, and location information. The user might be interested in detail information of the type of dog or cat in the captured media and the breeder of the dog or cat in the captured media with location and purchasing information. The user might be interested in a movie shown as a video trailer in a TV commercial and would like a reminder to see the movie or a reminder to purchase tickets or an option to purchase pre-sale tickets now. Those are several examples of captured services from a program. All virtual repository information may be associated with product or service details, product or services links or product or service codes, or entertainment information. An object may be an item. An object may be a numerical timestamp or duration value. An object or matching object may be a movie or television show scene. A matching object or object may be participant, participant details may include an image, product details, movie details, TV show details, scene information, numerical timestamp, colors, sizes, prices, services details, entertainment or TV guide schedule information, company logos, television or streaming channels, product categories, brand and retailer information. A user may also be a participant. A user may also be a viewer. Each user account may come with user personal information or business information. The smartphone application sends the PSP to a remote computing system, which includes a media identification module (MIM). The MIM receives and processes the PSP or the captured media of the PSP to determine if the captured media contains a watermark and/or to generate a fingerprint of the captured media.

A watermark is a signal (e.g., an audio signal that is imperceptible to humans) that is included in the audio or video of a program. By way of example, companies who track which programs are watched by users have implemented technology that allows broadcasters and other distributors to embed watermarks in the audio. If a watermark is detected, the program may be identified from a database or similar repository that relates known watermarks to programs. The watermark may not only identify the program but also provide a timing component that indicates the part of the program.

A fingerprint is a unique proxy or signature (e.g., a series of digital values, a waveform, etc.) generated from characteristics of the captured media. The fingerprint may be compared to a set of reference fingerprints corresponding to known programs. When a substantial match is found, the program and portion of the program that contains the captured media can be identified with a relatively high probability. Fingerprints and pre-determined fingerprints may be associated to matching objects. A computerized system and databases may be associated to APIs, datafeeds, and client portals. Fingerprints and pre-determined fingerprints may be associated to portals, APIs, duration value, data feeds, timestamps, or a pre-defined duration value that match program duration values to determine matching objects. The computerized system may automate and synchronized programs, user repositories, entertainment databases, entertainment information, brands, retailers, APIs, data feeds, timestamps, matching objects for faster processing and outcomes.

The MIM sends the user identification and program information to a Virtual Repository Matching Module (VRM). The VRM searches a database or other repository for records of users (e.g., individuals who appeared in the captured media and/or items that are managed by a user and appeared in the captured media or services related to items or objects in the captured media) associated with the identified program, and, in particular, with the portion of the program that contains the captured media. The accounts of the identified users are then searched to identify records of items and/or services that appeared in the captured media. Items may be associated to services. A user account may be associated to but not limited to an influencer, celebrity, business, organization, movie studio, TV Network, streaming service company, wardrobe supervisor, set designer, costume designer, fashion designer, and producer. A user account may use portal for outputs and inputs and communicating to the multi-directional system with timely efficiency and accuracy. (e.g. Portal for Retailers, Brands, TV Networks, Movie Studios, celebrities, and Fashion Designers to collaborate for the best outcome and profits.

A hierarchical linked list is then made accessible for display on the portable computing device for the consumer who selected the trigger. The list may include a first page that displays links to each user who has an account in the virtual repository. Such users may include acting professionals, news professionals, hosts, guests, and management (e.g., a producer) of a program. Selecting link for such a user leads to linked information for item records. Linked information for an item record or service may also appear on a list without being associated with the user or acting professional and additionally, the item record may be associated with the living room, kitchen, office or restaurant on the program for example. The item records are records of items that are in the user's virtual repository and are associated with the program, and, in particular, the portion of the program for the captured media. The items may also be linked. Selecting a link for an item may lead to additional information, including product details, for the item including purchasing information. By way of example, the link may lead to a site for purchasing the item. In some examples, through the site a consumer may purchase or bid in an auction to purchase the authentic item used in the program, which may come with a certificate of authenticity such as a printed certificate, electronic certificate or a non-fungible token (NFT), i.e., a unique digital identifier that cannot be copied, substituted, or subdivided, that is recorded in a blockchain, digital wallet, and is used to certify authenticity and ownership of the user, item, and the proof of purchase associated to the program or/and professional actor wearing the item and NFT may include the inventory or/and inventory count in numerical order in which the item was purchase from the program. The NFTs may be valued like memorabilia. For example, valuing the first, second, and third item purchased from the program more valuable than the ninety-eighth, ninety-ninth, and one hundredth item purchased from the program (e.g, Product Number). The NFTs are sent to the user, owner, or/and purchaser through a digital or computerized system after the purchase of each item from the program. The NFT may include user or professional actor, brand of item, retailer selling the item, category of the item (e.g., shirt, jacket), program name (e.g., Mission Impossible, Legally Blond), product name, product purchase number, color, size, price, date, time, and current owner (user that made the purchase or user whom which the item was purchase for). Alternatively, the link may lead to a retail site through which such an item may be purchased.

Through an affiliate program, a user may earn compensation (e.g., a commission) for each item purchased through such a link. In this manner, consumers are efficiently provided links to purchase items of interest that appear in a program, while actors, production companies and others associated with a program are compensated for garnering consumer interest and facilitating sales of the items, all without any explicit marketing and without any direct communication between the consumer and user.

In one exemplary implementation, a computer-implemented method of object linking from captured media entails, on a portable computing device, creating a pack including captured media, and sending the pack to a media identification module. Through the media identification module, a first fingerprint is generated for the captured media, the first fingerprint being unique to the captured media. Fingerprint generation may, optionally, entail transforming the captured media into a transform domain. Through a remote computing system, a fingerprint database configured to relate predetermined fingerprints to a plurality of programs is accessed. A plurality of predetermined fingerprints related to each program of the plurality of programs. Through the remote computing system, a search is performed for a matching fingerprint among the predetermined fingerprints. A distance between the matching fingerprint and the first fingerprint is less than the distance between the first fingerprint and any other predetermined fingerprint of the fingerprint database. From the plurality of programs, a matching program and program scene related to the matching fingerprint is identified. Through the remote computing system, a participant database is accessed. The participant database relates participant records to programs and scenes. A search is performed for a matching participant, the matching participant being a participant record related to the matching program and scene. Through the remote computing system, a virtual repository is accessed. A TV remote control, button, and a cursor may be used to initiate the trigger, media being captured, fingerprinting, watermarks, or/and virtual repository. The virtual repository is a database that relates user records to object records and relates object records to program records. A search is performed for a matching user or matching objects. The matching user is the user record for the matching participant. Matching objects are identified and identified with or without identifying the participant or user. The matching objects are object records related to the matching user and related to the matching program. A link to each matching object is sent to the portable computing device and may include a link to an online retailer for each matching object to the portable computing device. A non-fungible token may be associated with at least one matching object, as a certificate of authenticity, which may be important if an authentic object is acquired.

An auction bidding system may be associated with at least one or more matching objects or matching item. For example, if the participant Tom Cruise was wearing a shirt on the movie Mission Impossible, and the viewer triggers the program to capture media while Cruise wears the shirt, the matching object may be associated with a bidding system so viewers may bid on the actual or original object or item worn in the program. Auction bidding may start immediately when the program airs for the first time or later. Bidding on matching objects may last or for minutes, hours, weeks, or months. The actual or original matching object worn in the program by the participant may be sent to the user who won the bid including a signed autograph by the participant Tom Cruise.

In another embodiment a watermark is embedded into the captured media. The watermark may be a sound imperceptible to humans. The sound may be modulated to encode data. Through the media identification module, the watermark may be demodulated. Then the demodulated watermark may be searched in a watermark database that relates watermarks to programs and/or scenes of programs. If the program and scene are identified using this method, then fingerprinting may be unnecessary, but may optionally be carried out for confirmation.

To solve one or more of the problems set forth above, in an exemplary implementation of the invention, a computer-implemented method of managing a virtual repository system includes providing on a computing system a plurality of virtual repositories. Each virtual repository is assigned to a user. Each virtual repository includes item records for items owned and used by the user. A first trigger is received on the computing system, which includes a programmed computer, from a first computing device of a first user. The first trigger requests information associated with at least one virtual repository of the plurality of virtual repositories. Results are sent from the computing system to the first computing device. The results including links to at least one virtual repository of the plurality of virtual repositories in response to the trigger.

The exemplary method accepts various triggers. A target trigger requests information associated with at least one virtual repository of the plurality of virtual repositories assigned to an identified user. An event trigger requests virtual repository information for one or more users appearing at a scheduled event. A location trigger requests information for one or more users at the same location (which includes the vicinity) as the location of the first user who submitted the trigger. A media trigger contains an image, video or sound recording, from which a user's identity is determined via facial or speaker recognition. A product trigger identifies a product and seeks links to users and/or virtual repositories that contain item records that corresponds to the product. A directive trigger includes a condition, which, when satisfied, causes the computing system to send results that include responsive details. In all cases, displayed results may be filtered and sorted by the user In another aspect of an exemplary implementation of the invention a virtual repository method and system with robust item management automatically derives item data from accessed current and past transactions. The system interfaces with merchant systems to receive current and archived transaction data, scans emails for current and past transaction data, monitors browser data for online transaction data, and accepts manual input. The system establishes a communication channel with each remote disparate source. The system executes program instructions to harvest data from each local source. The system filters and collates data from all sources and stores the processed data in a virtual repository for presentation to a user in an easy to navigate GUI. Data obtained from all sources is filtered, collated, and stored in a cache for user input and approval. Approved cached entries are migrated into the virtual repository. The resulting virtual repository is an accurate reflection of the user's real-world acquisitions within a user-defined category. A management system enables scheduling and tracking use of, sharing information about and capitalizing on (e.g., selling, leasing, promoting, donating) items. Merchants may reward users for sales attributed to the user's promotion.

In one embodiment, an exemplary computer-implemented method of managing a virtual repository includes a step of a user, via a user computing device, creating a virtual repository. The virtual repository includes a virtual repository identification. A programmed system obtains, on a server, via network communication, item records from a plurality of third party sources, the item records being records of items (e.g., clothes, furniture, etc . . . ) acquired by the user. The programmed system collates the obtained item records. At this point the records are merged into a structured form, such as a table or list. The step of the programmed system collating the obtained item records entails extracting data from the obtained item records (e.g., identifying and storing data for the fields of each item record) and merging obtained item records into a table, each item record comprising a plurality of fields. The programmed system stores the collated obtained item records in a cache (i.e., a temporary storage). The programmed system presents to the user the collated obtained item records stored in the cache. This gives the user a chance to validate (e.g., accept, reject and delete, or modify) records. The user, via the user computing device, validates the collated obtained item records stored in the cache as presented by the programmed system. Then the programmed system associates the validated collated obtained item records stored in the cache with the virtual repository. The programmed system also stores the validated collated obtained item records on a storage device, whereupon the cache may be wiped clean (i.e., all records may be deleted from the cache). Each item record may include a photograph of an item or an address (e.g., URL or pointer) to a photograph of an item. An affiliate link may be associated with any of the validated collated obtained item records. The affiliate link allows affiliate compensation for click-through purchases by other users. A software component on the user computing device (e.g., a plugin, add-on or application) searches emails for item records, and provides the item records from searched emails to the programmed system for collating with the obtained item records, for subsequent validation in the cache. Another software component on the user computing device monitors browser activity for item records, and provides the item records from browser activity to the programmed system for collating with the obtained item records, again for subsequent validation in the cache. Manually input item records may be received on the user computing device and provided (communicated via network communication) to the programmed system for collating with the obtained item records, again for subsequent validation in the cache. At least one image and/or information relating to a virtual repository may be displayed on a display device of the user computing device. The displayed image and/or information may be one or more item photos, a navigable two-dimensional graphic representation of the virtual repository, a navigable three-dimensional graphic representation of the virtual repository, item photos arranged in a continuous list from which any photo from the continuous list is displayable by user command, several levels of item photos arranged in continuous lists from which any photo from a continuous list at each displayed level is displayable by user command. Virtual repositories and/or item records marked for sharing may be viewed (accessed for viewing but not changed) by other users. This allows users to browse virtual repositories and item records (e.g., images of items and information pertaining to such items) of other users. A user may record dates of use of items corresponding to item records. This facilitates management of items according to recorded use. Items may be marked for sale, rental and donation. In the cases of sale and rental, a marked item is shared with other users, who may purchase or rent the items through the system. In the case of donation, the user may select a charity to which the item may be donated.

A device such as a tablet, smartphone, computer or smart television, may display an image or a video (media) selected by a user. For example, in one implementation, the media may be an advertisement, commercial, a broadcast or streamed program, video or movie. An icon, link, button, and/or other similar selection mechanisms may be provided, as a trigger, to enable a user to select a scene or page, and/or to mark (e.g., with a cursor) a face of a person in the media. The selection device may be a remote control in the case of television, a paired smartphone, in the case of a smart TV, or any available input device in the case of a computer, tablet or smartphone.

A video may be a broadcast television program, a program streamed on demand or some other motion picture recording. An image or photo may be a photo taken with a user's device, or a photo accessed by a user from an accessible source (e.g., a photo obtained from the Internet) or a photo provided to the user's device by another person (e.g., a photo transmitted to the user by email or SMS).

Identifying information may facilitate identification of subjects of a video or photo. By way of example, in the case of a broadcast program, the broadcaster (e.g., ABC, CBS, NBC, FOX, etc . . . ), locale and time of broadcast may be used to identify the program. Such information is available from broadcasters, guides (e.g., television program guides) and data aggregators such as GraceNote. The identification of all individuals appearing in an identified program may also be determined from information available for the program, from such sources. Similarly, in the case of a movie, the identification of all individuals appearing in an identified movie may be determined from information available for the movie, movie databases. Knowing the identity of individuals appearing in the video facilitates identification of the person of interest to the user, whether by facial or speaker recognition, or by user selection from a list of actors, actresses, performers, hosts, guests, news anchors, reporters, and the like.

In one embodiment, a database 170 includes temporal data for movies and television programs. Temporal data correlates time with appearing individuals. Thus, all appearing individuals are associated with time values indicating when the individuals appear in the video. The time value may be relative (e.g., relative to the start of the video at 0.0 hr, 0.0 min, 0.0 sec) or, for a broadcast program, actual time (e.g., at 3:45 pm EST). In this manner, determining the time of a scene of interest to a user reveals the individuals appearing in the scene. In this manner, the list of individuals may be greatly reduced from the full cast. Such reduction facilitates identifying a person of interest.

In the case of a photo, metadata may include location and time data. A database API may include event data, identifying an event, attendees, performers, locations, and times. The data may also include user location data, including historical location information and times. In this manner, a user appearing in the photo may be readily identified with or without facial recognition.

In one embodiment, information regarding a selected scene is provided to the user. By way of example and not limitation, a database of program information may contain the names of actors in each program. For a television program the time, location and channel may be used to determine the program. The time and location may be determined from a user's computing device. The tuned channel may be determined from a smart TV, smart cable box or smart satellite receiver via communication with a paired smart phone or other computing device, or by user input.

In another implementation, facial recognition may be applied to all faces in a selected scene or to a selected face in a scene. A copy of the scene or a copy of the image of the selected face may be communicated from the device (e.g., tablet, smartphone, computer or smart television) to a server (e.g., server) for facial recognition processing using facial recognition software.

BRIEF DESCRIPTION OF THE DRAWINGS

The foregoing and other aspects, objects, features and advantages of the invention will become better understood with reference to the following description, appended claims, and accompanying drawings, where:

Figure 1:
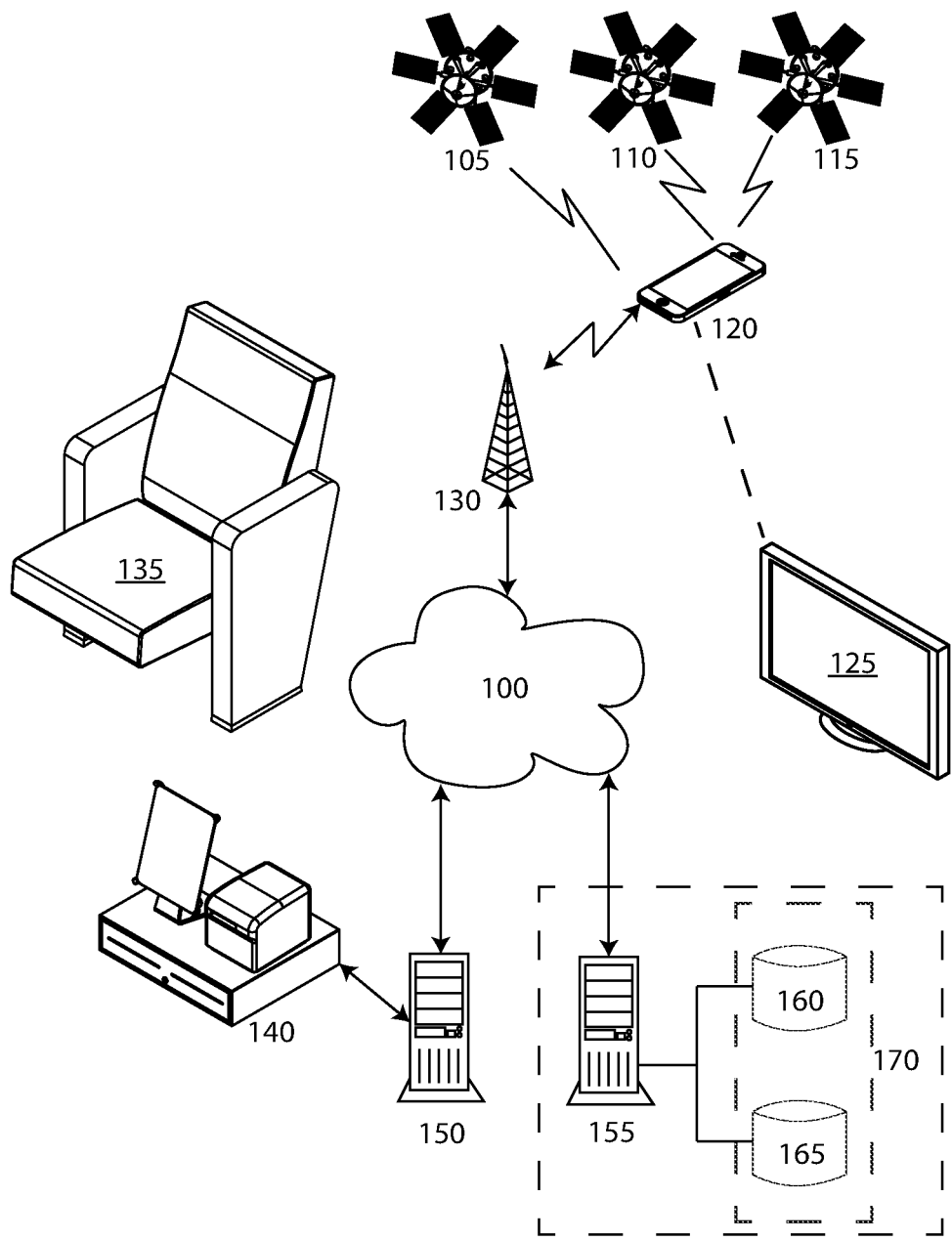
FIG. 1 is a high level block diagram of exemplary networked computing devices on which a method and system according to principles of the invention may be implemented.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary system and method according to principles of the invention, through a media identification module (MIM), identifies a program (e.g., TV show, movie, news broadcast or other content) from media (audio or video) captured on a portable computing device, and through a Virtual Repository Matching Module (VRM) identifies individuals and objects from the scene corresponding to the captured media and objects (e.g., garments, accessories, furniture) used in the scene, and provides links through which such objects may be considered and purchased.

Sequential MIM/VRM operations provide a unique technological advancement that connects object records to captured audio or video. The sequential MIM/VRM detects and demodulates any embedded watermark, fingerprints the captured audio or video for matching in a database of fingerprints for scenes (portions) of programs, identifies participants for the scene from a database that relates participants such as actors and producers to programs and scenes of the program, and identifies object records associated with the program or scene from the participants' virtual repository accounts. Heretofore, no such automated means of connecting object records to a scene existed. The object records enable linking for useful purposes.

An exemplary virtual repository method and system with robust item management automatically derives item data from accessed current and past transactions and user input. The system may interface with merchant systems to receive current and archived transaction data, scan emails for current and past transaction data, monitor browser data for online transaction data, and accept manual input. The system may establish a communication channel with each remote disparate source. The system may executes program instructions to harvest data from each local source. Data obtained from all sources may be filtered, collated and stored in a cache, for user review, modification and approval, whereupon the data populates a virtual repository. The resulting virtual repository accurately reflects a user's real-world possessions, acquisitions and tools of trade within a user-defined category, which facilitates managing (e.g., using, sharing, disposing of) and capitalizing on (e.g., selling, leasing, promoting, donating) acquired items. The virtual repository is not limited to data items that a user wears or uses day to day. Rather, by way of example and not limitation, data may correspond to apparel a user has worn in a TV program, or a movie, or accessories or other items used in a scene of a TV program or movie.

A user may be an individual, a business or an organization. An individual may be any person or a famous person such as a celebrity. A celebrity may be an actor, performer, athlete or person of other notoriety. A business may include a television or movie production company, or some other enterprise. In accordance with principles of the invention, at least some users are actors and/or television or movie production businesses.

An implementation of the present invention may be embodied in hardware and/or in software (including firmware, resident software, micro-code, etc.). Furthermore, the present invention may take the form of one or more computer program products on one or more computer-usable or computer-readable storage media having computer-usable or computer-readable program code embodied in the media for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific non-limiting examples (a non-exhaustive list) of a computer-readable medium include random access memory (RAM), a read-only memory (ROM), an erasable programmable read-only memory (EPROM or Flash memory), a hard disk drive, a solid state drive, and optical discs.

Computer program code or "code" for carrying out operations (e.g., steps) according to the present invention may be written in any programming language compatible with the corresponding computing devices and operating systems.

Software embodiments of the present invention do not depend on implementation with a particular programming language.

The computer program code may be provided to a processor of a general-purpose computer, special purpose computer, or other programmable computing apparatus (e.g., a phone, personal digital assistant, tablet, laptop, personal computer, or computer server) as instructions, such that the instructions, which execute via the processor of the computer or other programmable data processing apparatus, create means for implementing the functions described herein. The computer code may be stored in a computer-readable memory that can direct a computer or other programmable data processing apparatus to function in a particular manner, such that the instructions stored in the computer-readable memory produce an article of manufacture including instruction means which implement the functions and perform the steps specified in the illustrations and described herein.

Referring now to FIG. 1, a high level block diagram of hardware components of a system according to principles of the invention is conceptually illustrated. Consistent with the present invention, users of the system use computing devices, such as a smartphones 120, tablets, laptop computers, personal computers, desktop computers or servers 150, communicating in a wireless or wired mode via the Internet 100. The computing devices (i.e., clients or client devices) are equipped with software for inputting and displaying information in accordance with the methodologies described herein. Such software may comprise a web browser, a client application and/or a mobile device app. Some of the computing devices 120 may be equipped with cellular wireless communication modules providing internet access via wireless cellular communication infrastructure 130. Some of the devices may be used by end users for creating and managing virtual repositories, while other devices (e.g., point of sale device 140 and server 150, 155) may be used by merchants to supply data and provide rewards or for back-end processes.

A virtual repository is an aggregation of data pertaining to items, which may be presented to a user in an easy to manage graphical user interface. The items of a virtual repository may fall within a category, such as clothing. The virtual repository may be shared by a user, allowing other users to access the virtual repository for viewing and other allowed actions (e.g., commenting and click-through purchasing). Specific items within a virtual repository may be shared, allowing other users to access data for those items for viewing and other allowed actions (e.g., commenting and click-through purchasing). A graphical user interface may present in data in lists, tables, navigable 2D or 3D models, or augmented reality displays. A user may create a plurality of virtual repositories, assign items to one or more virtual repositories. Data may be stored in a temporary cache (temporary storage). A user may review and verify the cached data, modify or delete the cached data, and assign it to one or more virtual repositories. A system and method according to principles of the invention may also collate manual entries into the virtual repository.

Referring still to FIG. 1, one or more computers such as server 155 includes or has access to a database management system for managing data. One or more databases may contain aggregations of data records or files, pertaining to virtual repositories. A communications network interconnects the server 155, directly or indirectly through one or more additional computers, with the Internet 100. Interconnected computers communicate with each other through mechanisms such as interprocess communication, remote procedure call, distributed object interfaces, and various other program interfaces. The databases may be stored on one or more storage devices 160, 165, collectively the data storage 170. The database may be queried using various database access means such as SQL (Structured Query Language), a standard language for interacting with a database; Open Database Connectivity (ODBC), an open standard API for accessing a database; DCOM (Distributed Component Object Model), a set of Microsoft tools and program interfaces for enabling client program objects to request services from server program objects on another networked computer; Common Object Request Broker Architecture (CORBA), an architecture and specification which allows programs at different locations and developed by different vendors to interact in a network through an interface broker, or any other suitable methodology and protocol now known or hereafter developed. Illustratively, a client device 120 may execute one or more processes that interact with server 155 to supply, access and manage data stored on the data storage 170. Each request received by the server 155 may be submitted as a TCP/IP communication packet including an IP address and socket number. In response to valid requests, the server 155 may provide data from the data storage 170, without compromising the integrity of the database. In addition to a virtual repository, the data storage may contain a database of media (i.e., audio and/or video) fingerprints corresponding to content (e.g., streamed programs (e.g., TV programs), shows and movies).

Using an application on a portable computing device such as a tablet or smartphone 120, a consumer may select a trigger. The user may direct the smartphone to a program on a television 125, or as a member of an audience in a movie theater 135 at a movie playing on a movie screen. The trigger creates a percipient sample pack (PSP). The PSP may include a user identification, location information, time information and captured media. Thus, the PSP may contain information and captured media. The user identification, location information, time information are PSP information. The captured media is PSP media. The captured media is recorded audio and/or video of a target. The target may a television program (e.g., a show or movie, TV commercial), a streamed program, or a program from another source, such as a recording medium (e.g., a DVD), the Internet or a program delivery service that provides content by network communication, which may be displayed on television (TV) 125, or a movie played in a theater in which the user is seated 135. The captured media may be a portion of the target, i.e., a portion of interest to the user. The user may be interested in the participants who appear in the captured media, the garments or accessories they are wearing, items they are using or other objects that appear in the captured media.

A server 150, 155 may also implement a media identification module (MIM), which receives and processes a percipient sample pack (PSP), determines if captured media contains a watermark and/or generates a fingerprint of the captured media. A watermark is a signal (e.g., an audio signal that is imperceptible to humans) that is included in the audio or video of a program. By way of example, companies that track which programs are watched by users have implemented technology that allows broadcasters and other distributors to embed watermarks in the audio. If a watermark is detected, the program may be identified from a database or similar repository that relates known watermarks to programs. The watermark may not only identify the program but also provide a timing component that indicates the part of the program. A fingerprint is a unique proxy or signature (e.g., a series of digital values, a waveform, etc.) generated from characteristics of the captured media. The fingerprint may be compared to a set of reference fingerprints corresponding to known programs. When a substantial match is found, the program and portion of the program that contains the captured media can be identified with a relatively high probability.

The MIM sends the user identification and program information to a Virtual Repository Matching Module (VRM), which may be executed on a server 150, 155. The VRM searches a database 170 or other repository for records of users (e.g., individuals who appeared in the captured media and/or items that are managed by a user and appeared in the captured media) associated with the identified program, and, in particular, with the portion of the program that contains the captured media. The accounts of the identified users are then searched to identify records of items that appeared in the captured media. The VRM may search the database or repository for records of items managed by another user without being associated to a participant in the program or capture media and list those item records. The VRM may also search the database or repository for records of items managed by another user and the participants in the entire program associated to item records and listing or displaying the item inventory and participants shown throughout the entire program.

A hierarchical linked list is then made accessible for display on the portable computing device 120 of the consumer who selected the trigger. The list may include a first page that displays links to each user who has an account in the virtual repository. Such users may include acting professionals, news professionals, hosts, guests, and management (e.g., a producer) of a program. Selecting link for such a user leads to linked information for item records. The item records are records of items that are in the user's virtual repository and are associated with the program, and, in particular, the portion of the program for the captured media. The items may also be linked. Selecting a link for an item may lead to additional information for the item including purchasing information. By way of example, the link may lead to a site for purchasing the item. In some examples, through the site a consumer may purchase or bid in an auction to purchase the authentic item used in the program, which may come with a certificate of authenticity such as a printed certificate, electronic certificate or a non-fungible token (NFT), i.e., a unique digital identifier that cannot be copied, substituted, or subdivided, that is recorded in a blockchain, and is used to certify authenticity and ownership. Alternatively, the link may lead to a retail site through which such an item may be purchased.

The location of a user may be relevant to the target. Certain programs are broadcast in certain markets at certain times. In certain embodiments of a system and methodology according to the principles of the invention, a user's location may be specified. Location may be user input or automatically determined using GPS data, IP trace or triangulation information. Some of the computing devices may be equipped with Global Positioning System ("GPS") receivers for receiving signals from GPS satellites 105-115 to determine location of the device.

Certain clients 120 may not have access to a GPS service (for example, they may lack hardware necessary to support such a service or they may be within a structure that blocks GPS signals); consequently, such GPS information may not be available for all clients 120. Also, certain GPS services do not operate or do not operate reliably in certain locations, such as indoors or other enclosed spaces. Thus, even if a user 120 does have the necessary hardware and software to support a GPS service, occasionally GPS information from the GPS service may not be available to a particular user 120.

IP trace information may include the public IP address of the user 120 and the set of IP addresses that data packets sent from the user 120 pass through to reach server 150. The public IP address of the user 120 may be determined by gathering the source IP address from the server socket receiving the user 120 connection. The list of hops through which the data packets sent from the user 120 go through may be determined by sending adaptive TTL (time to live) UDP packets to server 150 from the user 120. In order to determine if the user 120 is being an IP proxy, server 150 may correlate the list of hops with the public IP address of the user 120. In this way, server 150 may effectively discover the real public IP address of the user 120. The real public IP address of the user 120 is then matched against a database of Internet Service Providers (ISPs) which returns the probable address of the originating user 120 message. This probable address of the originating user 120 message may then be translated to a set of longitude and latitude coordinates.

Triangulation information for a user 120 may include a list of public Wi-Fi access points surrounding the user 120 as well as the signal strength of each Wi-Fi access point accessible by the user 120. The list of surrounding Wi-Fi access points, and their signal strength, may be formatted and correlated with a database of public Wi-Fi access points by server 150 to determine a probable set of longitude and latitude coordinates for the user 120. The database of public Wi-Fi access points employed by server 150 may be updated over time to reflect new information about available Wi-Fi access points.

The invention is not dependent upon location information. Certain implementations of the invention may not take location into consideration. In implementations that take location into consideration, certain types of location data may be more accurate or reliable than others. GPS information is more accurate and indicative of the correct physical location of a user 120; however, as explained above, GPS information for a particular user 120 may not always be available. Triangulation information, while not as accurate and reliable in identifying the correct physical location of a user 120 as GPS information, is more accurate and reliable than IP trace information. However, triangulation information also may not always be available, e.g., the user 120 may not be able to detect any nearby recognizable Wi-Fi access points. Additionally, while IP trace information is less accurate than either GPS information or triangulation information in determining the correct location of a user 120, it is always obtainable if the user 120 can communicate to server 150 over the Internet.

The term "service provider" is used herein to mean any entity that provides a service using a system or methodology according to principles of the invention. The service provider may be, for example, an online service provider with a web-accessible system that receives, sends, stores and processes data and instructions for managing and sharing a virtual repository according to principles of the invention. The terms "consumer" or "client" is used herein to mean any individual or entity that uses the service provider's services to manage and share a virtual repository, whether for free or in exchange for compensation. The term "user" or "end user" is used herein to mean any individual or entity that uses the system for managing and sharing a virtual repository according to principles of the invention. In many cases, a user is a consumer. However, in some cases, a consumer may have an assistant or agent use the system on the consumer's behalf. A merchant is a commercial party (e.g., a vendor of goods or services, a credit card processor or another service provider), who may access the system for performing such actions as supplying data and rewarding consumers. A merchant may also be a consumer, client, and end user. Likewise, a consumer, client, and end user may also be a merchant.

Figure 2:
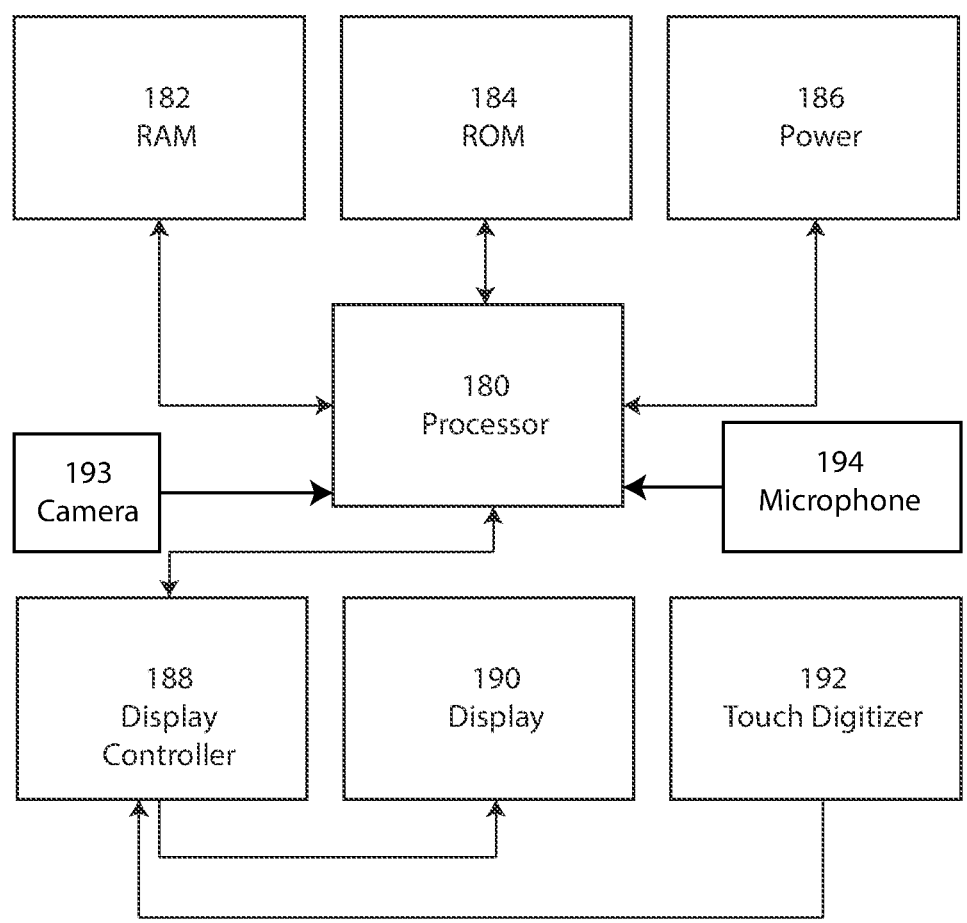
FIG. 2 is a high level block diagram of exemplary components of an exemplary portable computing device which may be used to implement and use a method and system according to principles of the invention.
Figure 3:
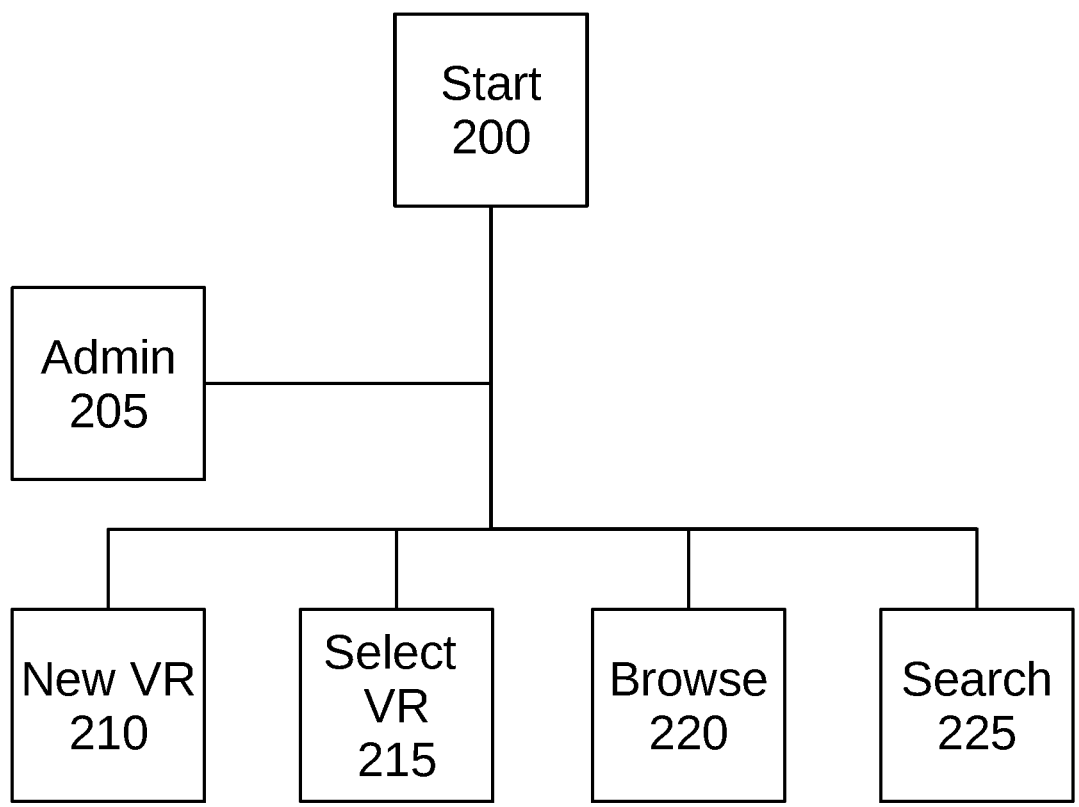
FIG. 3 is a high level flow chart of exemplary steps of using a method and system according to principles of the invention.

Using the computing device 120 and client software ("client") such as a browser or app, a user may create, manage and share a virtual repository according to principles of the invention Each exemplary computing device for use in accordance with principles of the invention includes a processor, memory, power supply, display, storage and user input device. Other components include a communication bus, and network communication components, such as cellular, WiFi and LAN. By way of example, and not limitation, with reference to FIG. 2, a mobile device such as a smartphone 120 may include one or more processing units (CPU's) 180, memory such as RAM 1825 and ROM 184, and a power supply 186. Additionally, the device 120 may include a display controller 188, a display 190 and a touch digitizer 192. Furthermore, the device 120 includes a camera 193 and/or a microphone 194 for capturing (recording) media (audio or video). These may comprise merely a few of the components of the mobile device 120. Various components may be implemented in hardware, software, or a combination of both hardware and software, including one or more signal processing and/or application specific integrated circuits.

The touch digitizer 192 comprises a touchscreen, an electronic visual display that the user can control through simple or multi-touch gestures by touching the screen with a special stylus/pen and-or one or more fingers. The touchscreen enables the user to interact directly with what is displayed, rather than using a mouse, touchpad, or any other intermediate device (other than a stylus, which is optional for most modern touchscreens). The touch digitizer 192 further comprises a transparent overlay covering the visual display. The overlay senses the touch of one or more fingers or a stylus. In response to a touch, the overlay produces a change in electrical properties (e.g., a change in current, voltage, capacitance or resistance). The touch digitizer interprets the commands that the changed electrical properties represent and communicates the commands to the appropriate applications. The touch digitizer 192 further comprises a display controller that receives and/or sends electrical signals from and to the visual display and overlay. Visual output may include graphics, text, icons, video, and any combination thereof (collectively termed "graphics"). In some embodiments, some or all of the visual output may correspond to user-interface objects. The display controller (along with any associated modules and/or sets of instructions in memory) detect contact (and any movement or breaking of the contact) on the overlay and converts the detected contact into interaction with user-interface objects (e.g., one or more soft keys, icons, web pages or images) that are displayed on touch-sensitive display. In an exemplary embodiment, a point of contact between touch digitizer 192 and the user corresponds to a finger of the user. The visual display may comprise LCD (liquid crystal display) technology, LPD (light emitting polymer display) technology, or LED (light emitting diode) technology, although other display technologies may be used in other embodiments. The overlay and display controller of the touch digitizer 192 may detect contact and any movement or breaking thereof, including speed (magnitude), velocity (magnitude and direction), and/or an acceleration (a change in magnitude and/or direction) of the point of contact, using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display. These operations may be applied to single contacts (e.g., one finger contacts) or to multiple simultaneous contacts (e.g., "multitouch"/multiple finger contacts). Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

A system and method according to principles of the invention use a virtual repository populated with data. With reference to FIGS. 3-9, steps of using a virtual repository to populate it with data and access data are conceptually illustrated. A user may start an application (i.e., software application) on a computing device, as in step 200. The application provides access to functions, including administrative functions 205, functions for creating a new virtual repository as in step 210, functions for selecting an existing virtual repository as in step 215, functions for browsing the user's and/or other users' shared virtual repositories as in step 220, and functions for searching for other users' shared virtual repositories as in step 225. A user may select a function.

Figure 4:
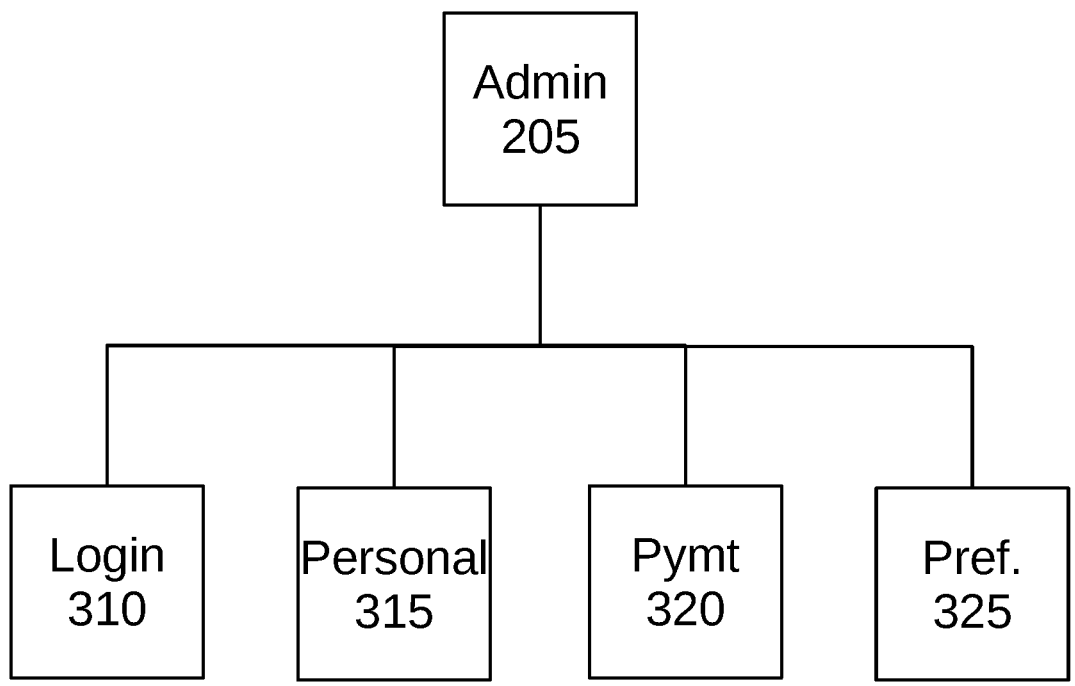
FIG. 4 is a high level flow chart of exemplary user administration steps for a method and system according to principles of the invention.

With reference to FIG. 4, administration functions 205 include functions for setting information and preferences for a user. A user may establish a login, which may include a user name and password, as in step 310. For multifactor authentication, a user may also provide a smartphone number and/or email address. A user may input personal information, such as name, address, screen name, telephone number, email address, information regarding the user's profession, a photograph of the user, and links to other information about the user, as in step 315. A user may input payment information for any commercial transactions performed using the system, as is step 320. The information may include card information, a billing address, and a default shipping address, The user may also specify preferences, including security preferences related to privacy of the user's virtual repositories, display settings, notification settings, and sound settings, as in step 325.

Figure 5:
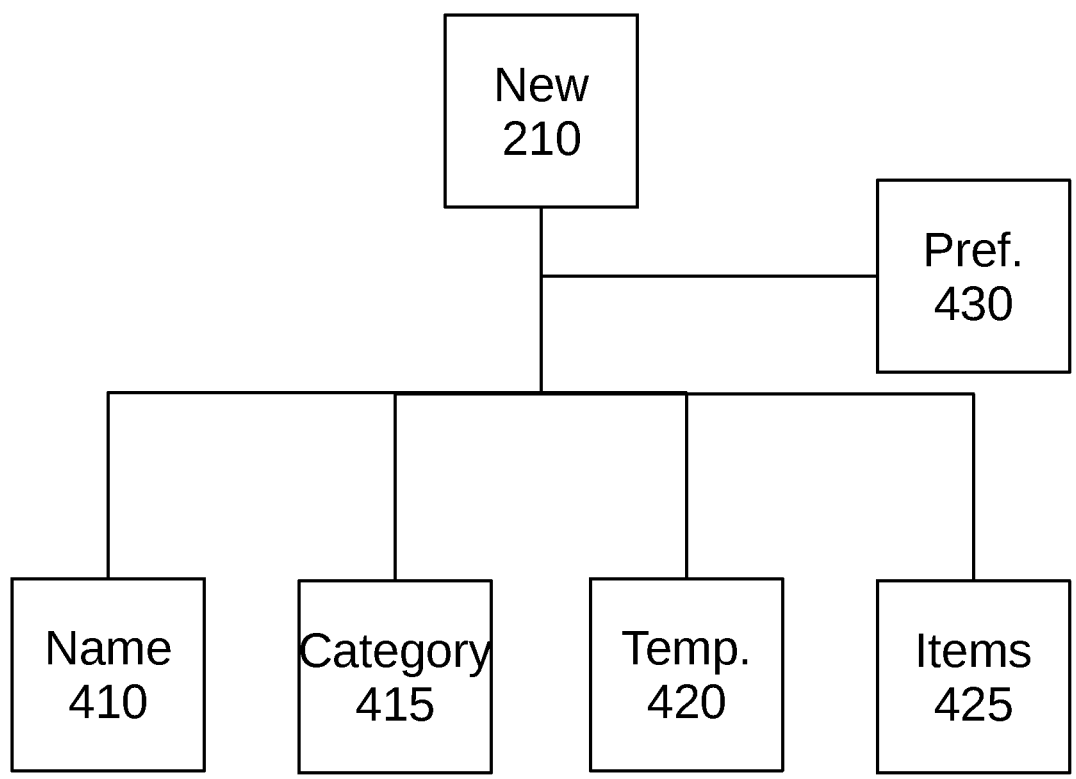
FIG. 5 is a high level flow chart of exemplary steps for creating a new virtual repository for a method and system according to principles of the invention.

FIG. 5 is a high level flow chart of exemplary steps for creating a new virtual repository for a method and system according to principles of the invention, as in step 210. A user may assign a name for the new virtual repository, as in step 410. A user may assign a category for the new virtual repository, as in step 415. A user may select a template for the presentation (display) of the virtual repository, as in step 420. Available templates may, by way of example, include a list, side-to-side scrolling presentations, top-to-bottom scrolling presentations, navigable 3D models of a space such as a closet, and even augmented reality displays of the user's actual closet. The scrolling presentations may include multiple levels (as discussed below), allowing a user to separately scroll through various subcategories of items within a virtual repository. By way of example, a three level scrolling display may allow a user to separately scroll through the user's shirts, pants and shoes. As another example, an augmented reality presentation may allow a user to walk through a closet while aiming a smartphone at the items in the closet, and receive information about each item on the display. A user may setup more than one template, for the user to select from when using the application. Item records are created in step 425. Item records may include, inter alia, item images, a description, and other information, such as an event, program or movie in which the item was used. The user may manage preferences for the virtual repository in step 430.

Figure 6:
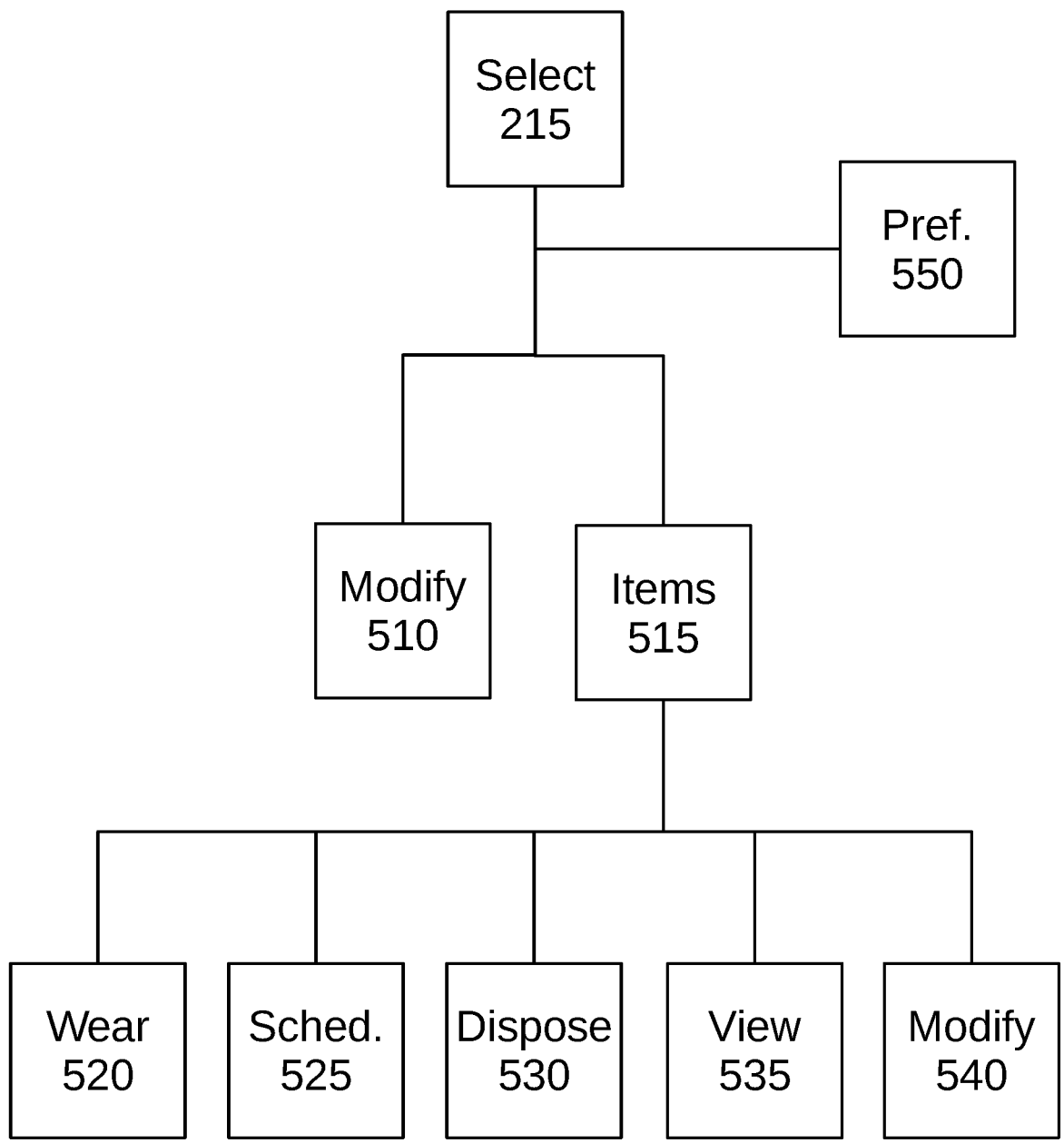
FIG. 6 is a high level flow chart of exemplary steps for managing items in a virtual repository for a method and system according to principles of the invention.

FIG. 6 is a high level flow chart of exemplary steps for managing a virtual repository for a method and system according to principles of the invention, as in step 215. Upon selecting a previously created virtual repository, the user may manage (e.g., review and edit) preferences as in step 550, modify the virtual repository's name or category as in step 510 or select or modify items, as in step 515. In the case of clothing items, an item may be selected for wearing, as in step 520. Alternatively, an item may be scheduled for wearing on a scheduled date and time, or during a specific event, such as an appearance, TV show or movie, as in step 525. An item may be disposed of (e.g., sold, discarded, donated or given away) as in step 530. An item may be viewed, as in step 535. Viewing an item may display information about the item, including use-related information. Selection for wearing and scheduling may be modified in step 540.

If a user enters into the system information about wearing (or otherwise using) each item, then the system may present a history and/or frequency of use. A system and method according to principles of the invention may save all entered dates of use, as in step 520. For example, a user may enter each date on which the user wore a particular garment. From such dates, the system may determine the last time an item was used and a frequency of use. Date of use data may alert a user to unused, infrequently use and frequently used items. A system according to principles of the invention may notify a user of items that the user did not use in a determined number of days (e.g., 100, 180 or 365 days). Knowing specific dates of use may also help a user determine if the same item should be used (e.g., worn) again. For example, a user may want to avoid wearing the same suit on a follow-up job interview, or the same dress at an upcoming event or party that will be attended by some folks who attended a previous party.

An item may be modified (i.e., stored information pertaining to the product may be modified) as in step 540. Modification may include adding comments about comfort, fit, and accessories. For example, a user may note that a garment fits loosely or tightly, or is best worn with a particular accessory. Some such notes may be accessible only by the user, and other notes may be shared with other users.

A system and method according to principles of the invention may incentivize users to input use dates for an item. Such use may be input by simply selecting the item and selecting a current use button or by selecting the item and providing a verbal command, or by entering a date. As described above, a user's location may be tracked through a device, such as a smartphone. Inputting use dates helps a user track which items are used and when, which, as discussed above, is beneficial. Additionally, use information may lead to rewards. Shared items are visible to other users.

A worn item may be a shared item. Other users may search for an item worn by a user at an event, or on a certain date and time, and/or at a specific location, or during a movie, or TV show or public appearance. Upon finding the item, such other users may click through the item to purchase it from a merchant. Through an affiliate program, the merchant may reward the user who shared the item. Such reward may be a payment to an account of the user. To maximize such payments, users will want to regularly input use dates, share items and wear items well.

Disposing of an item, as in step 530, may entail selling, renting, donating, gifting or discarding an item, and thereupon removing the item from the virtual repository, or, in the case of renting, marking the item as unavailable during the rental term. These functions enable a user to capitalize on items.

For example, using the information about an item in the virtual repository, a selling price or auction bidding terms, and one or more current photographs of the item, the item may be marked for sale. Upon being marked for sale, the item is shared and may be searched and viewed by all other users of the system. Such other users may purchase or, in the case of an auction, bid on purchasing the item.

Similarly, a user may mark an item for donation, which may present a list of willing charitable organizations in the vicinity of the user who would be glad to receive the item. The user may select an organization from the list. A record of each completed donation may be generated for tax deduction purposes.

An item may be marked for renting. For example, a user may own a ball or bridal gown, tuxedo, a costume, skiing apparel, a wetsuit, or some other expensive and infrequently used item. The user may be receptive to renting the item to other users. By marking an item for rental, that item is searchable by all other users of the system. Such other users may rent the item.

By providing the sale, donation and rental functions, a system according to principles of the invention facilitates capitalizing on items. Items that a user does not use, or infrequently uses, may be sold, rented or donated. In each case, the user receives a benefit. In the case of sales or rentals, the user receives monetary compensation. In the case of donation, a tax reduction may be earned. In each case, the user gains the knowledge that an item has not gone to waste, but rather is put into good use.

While other systems for selling, leasing and donating items may exist, none is tied to an existing virtual repository. By tying the such systems to a virtual repository, a system and method in accordance with principles of the invention facilitates identifying unused or infrequently used items, and also facilitates posting such items for sale or rental, or donating such items to a worthy charity.

Figure 7:
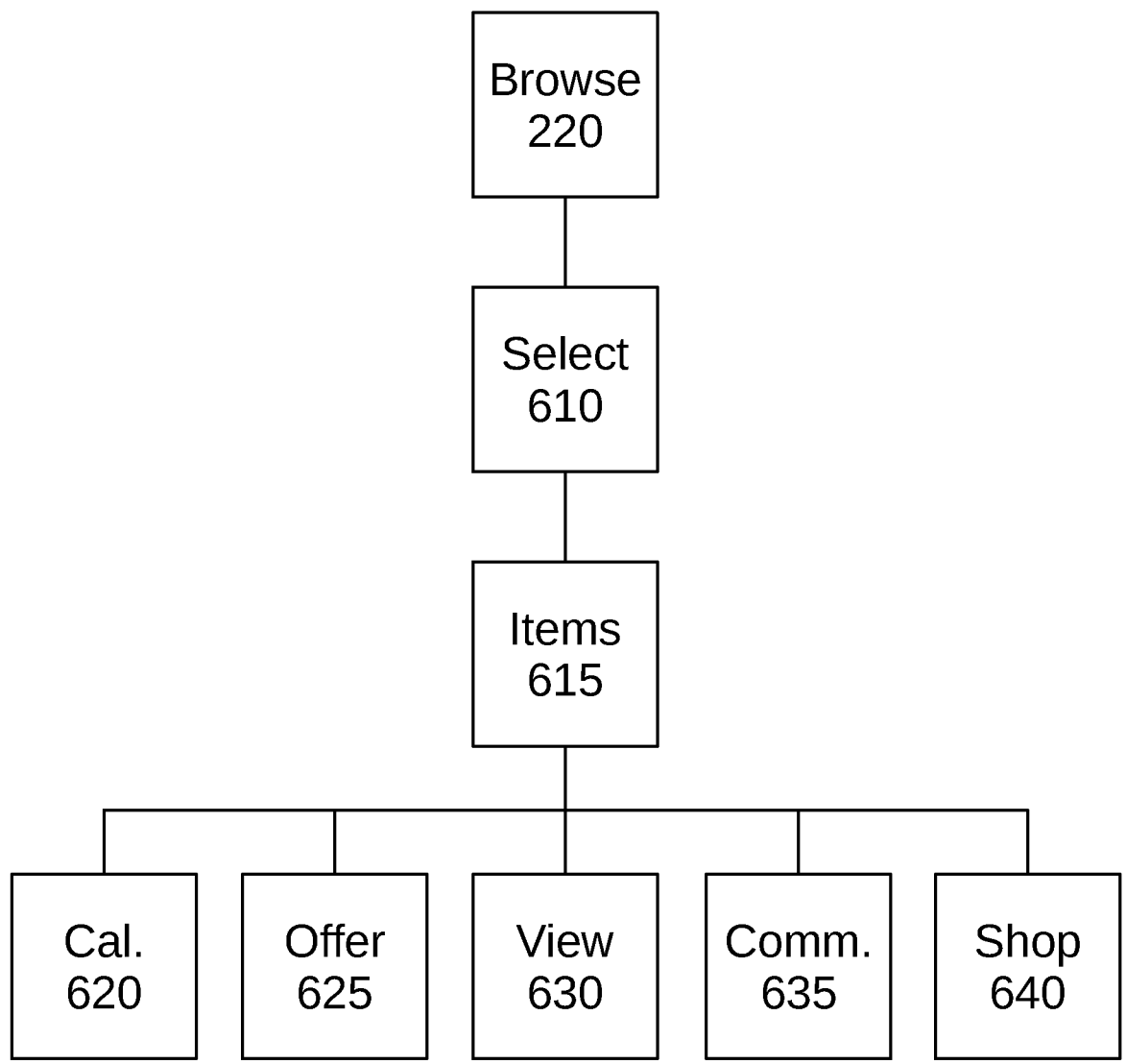
FIG. 7 is a high level flow chart of exemplary steps for performing actions relating to items in a virtual repository for a method and system according to principles of the invention.

FIG. 7 provides a high level flow chart of exemplary steps for performing actions relating to items in a virtual repository for a method and system according to principles of the invention. In particular a user may browse items in the user's virtual repositories, as in step 220. A user may select a virtual repository from a list of the user's virtual repositories, as in step 610. A user then may view and select an item in the virtual repository, as in step 615. The user may calendar the item, as in step 620. By calendaring the item, the user indicates a date on which the user intends to use (e.g., wear) the item. A user my offer to sell or rent the item, as in step 625. The terms of the sale or rental may be set by the user, within determined parameters of the system. The use may view the items, as in step 630. A photograph of each item may be stored as item data, as described above. The photograph may be user supplied or obtained from a vendor's online posting for the product. A user may enter comments about an item, as in step 635. For example, a user may describe the comfort, fit or feel of an item, or describe an event at which the item was used (e.g., worn), or enter other information (e.g., an endorsement) relating to the product. A user may locate the item in a retail establishment, as in step 640. By locating the item in an online or brick and mortar retailer, the user may shop for other similar or matching items and accessories.

The flow chart of FIG. 7 also applies to browsing shared virtual repositories and items of other users. A list of virtual repositories may be generated by a search from a search engine or from a directory. A user may search for a particular user's virtual repository, a celebrity's virtual repository, a virtual repository that contains certain items. A user may navigate through categories and subcategories of a directory to generate a list of repositories. Filters may be provided to narrow the list. A user may select a repository as in step 610. A list of shared items in the repository is presented, as in step 615. A user may select shared calendar information for a selected item, as in step 620. Such information reveals when the user used (e.g., wore) the item. A user may offer to purchase the item an item from such a list, as in step 610. A user may simply view the item, as in step 630. A user may enter comments about the shared item, as in step 635. A user may shop for the selected item, as in step 640. Purchase of the selected item may lead to a reward (e.g., compensation) for the user who shared the item.

An affiliate program may track click-throughs to merchant sites and enable payment of commissions to a user who shared the item and from which the purchase originated. To enable affiliate compensation, an affiliate link may be associated with each shared item. The affiliate link carries information that identifies the source of the click-through so commissions can be accurately payable. In one embodiment when an affiliate link is clicked, a cookie is deposited on the user's computing device. When a user completes a sale on the merchant's site, the merchant checks to see whether their cookie is present on the user's computing device. If it is, the merchant can access information from the cookie about the user that shared the item and generated the sale lead, and can then attribute the sales commission to that sharing user. Merchants can set the commission structure and cookie lifetime via the affiliate network. For instance, a merchant may decide to assign a cookie lifetime of 60 days, which means any sale made on the merchant's site by a user within 60 days of the user first visiting the merchant's site via the sharing user's repository, is commission-generating for the sharing user.

Figure 8:
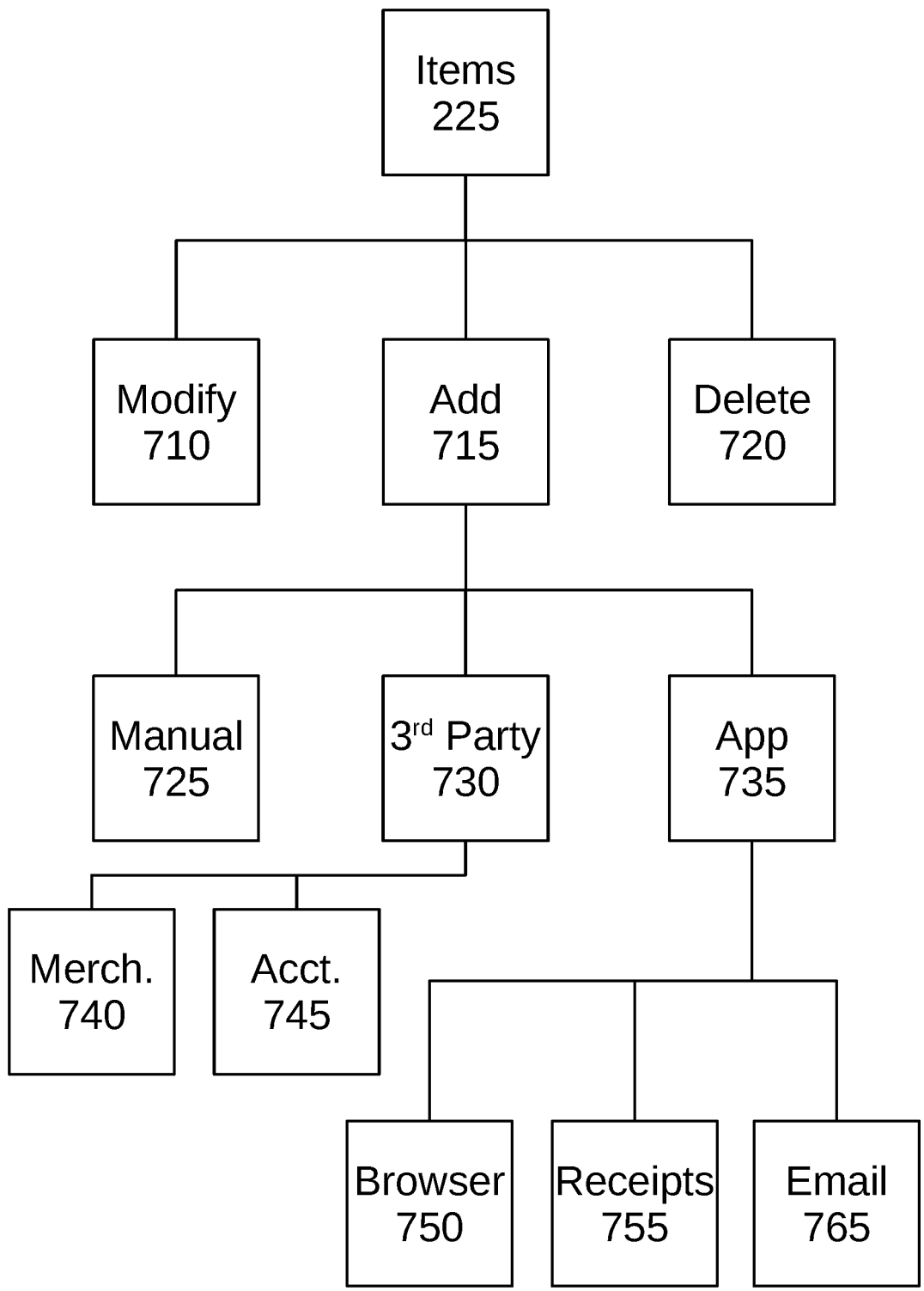
FIG. 8 is a high level flow chart of exemplary steps for adding items in a virtual repository for a method and system according to principles of the invention.

FIG. 8 is a high level flow chart of exemplary steps for modifying, adding and deleting items (step 225) in a virtual repository for a method and system according to principles of the invention. Selected items may be modified as in step 710. Modification may include editing entered content and photographs. Selected items may be deleted as in step 720. Items may be deleted automatically if sold or donated using the system. Items may also be deleted manually at any time by the user who owns the virtual repository.

Items may be added manually, by user input, as in step 725. Manual addition may entail typed user input, uploaded files, scanned documents, optical character recognition of documents, and verbal commands.

Items may be added from third party sources, as in step 730. Third party sources may include purchase histories from accounts accessible online. Such accounts may include online retailer and marketplace accounts (e.g., online Walmart, Amazon and Macy's accounts). Another third party source may be merchants' point of sale system data. Participating merchants may communicate purchase data for participating users to the system via an application programming interface. The purchase data may be pushed by a merchant from point of sale transactions by the user. Alternatively, purchase data may be pulled by a user from a merchant's point of sale system, via an application programming interface. Even purchase data for purchases at most brick and mortar establishments are stored on merchant servers connected to their point of sale systems.

Items may be added via applications (e.g., plugins, portal, and add-ons) that monitor a user's browser activity and emails for purchase data, as in step 735. A browser plugin may track online purchasing activity, as in step 750. Online purchases are detected via the website and user selections, including online shopping cart activity. Emails, as in step 765, may provide order confirmations, many of which may contain a hyperlink to an account on a remote server where details of the transaction are provided. Accessing a remote account may require a login (e.g., user name and password), which the user can supply to the system. Emails may also provide detailed receipts, as in step 755. Receipts may also be uploaded by a user for processing. Such processing may entail optical character recognition and determining purchase data.

Data from sources other than manual entry may be stored in a cache or temporary storage until verified by a user. The cached data may be displayed to a user in a list comprised of records (rows) and fields (columns). Thus, a system and method according to principles of the invention merges (i.e., collates) data extracted for various sources, including remote (e.g., merchant systems) and local sources (e.g., mined emails) into a cached list for possible addition to a virtual repository. The user may verify each record for entry into the virtual repository. Data for a record may be modified by a user before verification. Records may be deleted by a user. For example, a user may determine that a record does not belong in the virtual repository, such as if the purchase is a gift for a friend.

Figure 9:
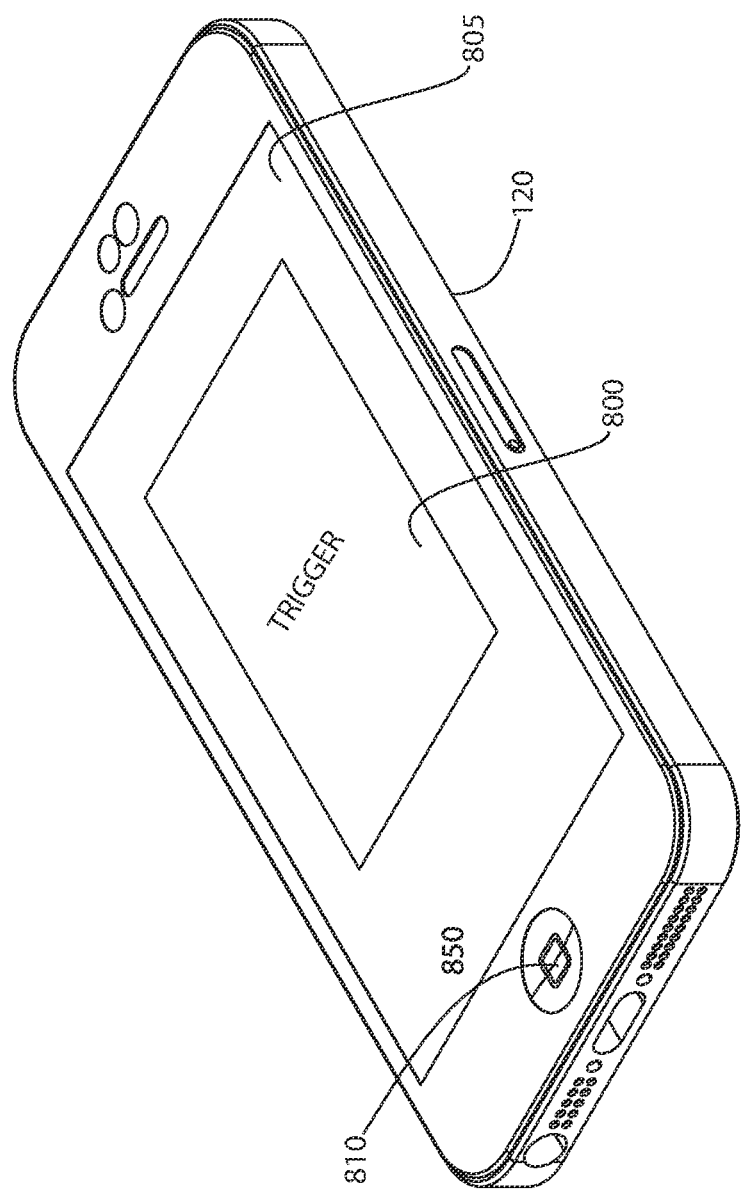
FIG. 9 conceptually illustrates an exemplary user device on which a trigger control is displayed according to principles of the invention may be used.

FIG. 9 conceptually illustrates an exemplary user device 120 on which a method and system according to principles of the invention may be used. The exemplary device includes a touchscreen 805 and a microphone 810. A camera may also be provided, with one or more lenses on the opposite side of the device. A graphical user interface may be presented on a touchscreen 805. The user interface may present a trigger control 800, such as the shown rectangle. Touching the rectangle may activate the trigger operation. The trigger operation initiates the method described below with reference to FIG. 10.

Figure 10:
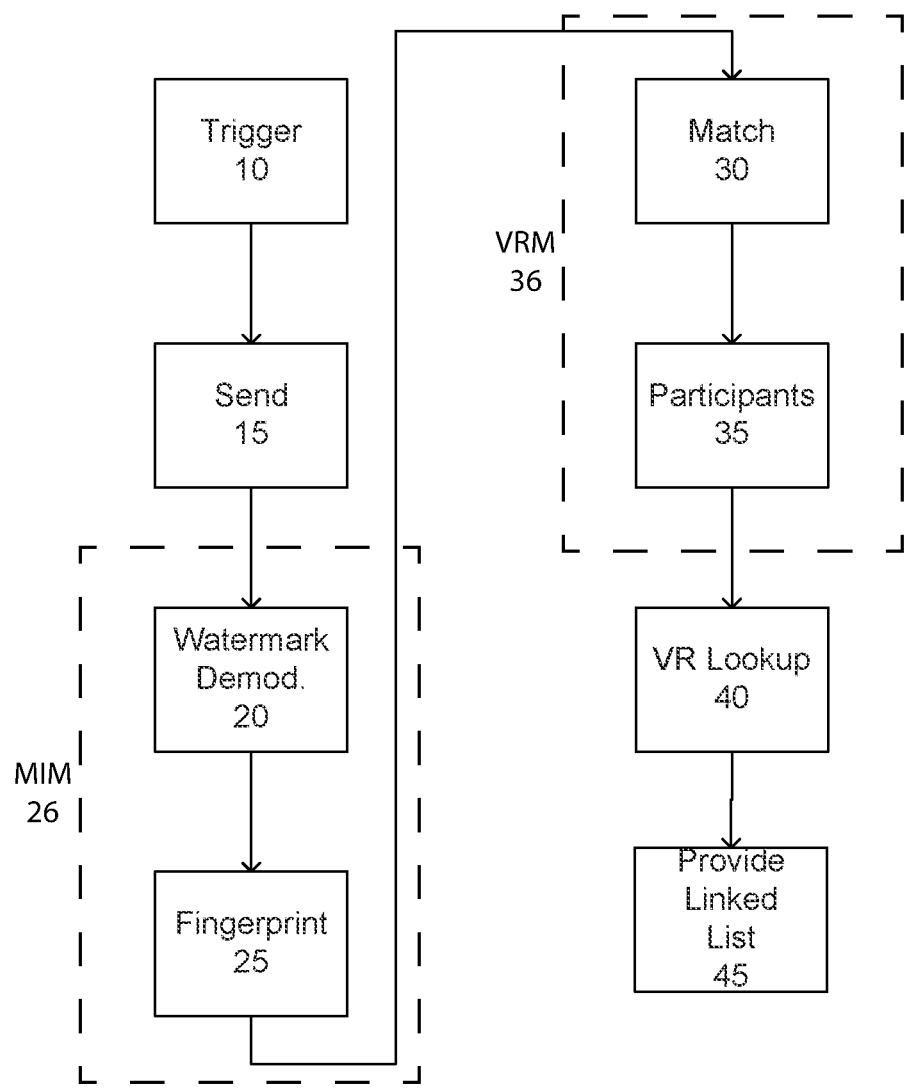
FIG. 10 conceptually illustrates components and steps of an exemplary method of media capture, fingerprinting and matching according to principles of the invention may be used.

With the virtual repository created and populated with data, including records corresponding to objects used in programs, such as TV shows, movies, events and the like, the virtual repository may be queried for such records. Referring to FIG. 10, using an application on a portable computing device 120, such as a smartphone, a consumer selects a trigger, as in step 10. The trigger creates a percipient sample pack (PSP). The PSP may include a user identification, location information, time information and captured media (i.e., recorded audio and/or video). The application may be configured to capture audio or video, or the application may allow a user to select whether to capture audio or video. Thus, the PSP contains information and captured media. The user identification, location information, time information are PSP information. The captured media is PSP media. The captured media is recorded audio and/or video of a target. The target is a television program (e.g., a show or movie), a streamed program, or a program from another source, such as a recording medium (e.g., a DVD), the Internet or a program delivery service that provides content by network communication. The captured media is a portion of the target, i.e., a portion of interest to the user. The user may be interested in the participants who appear in the captured media, the garments or accessories they are wearing, items they are using or other objects that appear in the captured media. Captured audio may be preferred, as it does not require a clear line of sight to the display, is not lighting sensitive and consumes considerably less storage space and bandwidth than an equivalent duration of captured video.

In step 15, the smartphone application sends the PSP to a remote computing system 155, which includes a media identification module (MIM) 26, comprised of one or more computer programs. The MIM 26 receives and processes the PSP or the captured media of the PSP to determine if the captured media contains a watermark and/or to generate a fingerprint of the captured media.

When captured media is comprised of captured video, the media may be cropped to eliminate elements that are not part of the broadcast or streamed video of interest. By way of example, the frame or bezel of a television screen may be cropped out of (i.e., removed from) the captured video. Thus, fingerprinting will take into account only the recorded segment of the video of interest. This invention is not limited to a particular cropping methodology. In one nonlimiting example, regions of interest are detected. These may be regions that contain moving objects and/or pixel color changes. Such movement and changes may be determined by comparing contiguous frames. The cropped area may encompass a cluster of regions of interest, including moving object regions and color change regions. If cropping is employed for captured video recorded with a trigger, then similar cropping may be performed to video segments comprising a reference fingerprint database.

A watermark is a signal (e.g., an audio signal that is imperceptible to humans) that is included in the audio or video of a program. By way of example, companies who track which programs are watched by users have implemented technology that allows broadcasters and other distributors to embed watermarks in the audio. Live broadcast and streamed content may include a watermark to track content distribution from its origin to its final destination. This may be accomplished through the insertion of a unique content identification code at a distribution center. The content identification code may be a second-by-second serial number used to uniquely identify delivered content. The code may be transmitted by modulating one or more carrier wave signals to encode digital information. The carrier wave signals may comprise sounds, inaudible to humans. Demodulating the appropriate frequency range of captured sounds provides the code. If a watermark is detected, it is demodulated to extract the modulated information, as in step 20. The program (i.e., show, movie, TV commercial, or event) may be identified from a database or similar repository that relates known watermarks to programs. The database may be stored locally 170 or accessed remotely via network communication. The watermark may not only identify the program but also provide a timing component that indicates the part of the program.

A database of program (e.g., show, movie and event) fingerprints may be stored locally 170. The database relates fingerprints to programs. A program may have a plurality of fingerprints, each fingerprint corresponding to a segment of the program. The method used to generate each fingerprint in the fingerprint database is also used to generate a fingerprint for the captured media in the PSP, as in step 25. The fingerprint for the captured media in the PSP may then be compared with fingerprints in the fingerprint database to find a match, as in step 30. The match reveals the program and the portion of the program that corresponds to the fingerprint.

A fingerprint is a unique proxy or signature (e.g., a series of digital values, a waveform, etc.) generated from characteristics of the captured media. The fingerprint may be compared to a set of reference fingerprints corresponding to known programs. When a substantial match is found, the program and portion of the program that contains the captured media can be identified with a relatively high probability.

The invention is not limited to a specific fingerprint methodology. Any fingerprint methodology that efficiently generates a unique fingerprint for each captured media and for segments of each program in the database may be utilized. In one exemplary implementation the fingerprint is comprised of information (e.g., a sequence of vectors) that efficiently and accurately describe the captured media. A searching engine then compares the generated fingerprint to those in a repository of reference fingerprints, for matching, such as by using a distance metric. The closest reference fingerprint may be the match.

As used herein, searching and matching for fingerprints entails similarity searching where, given a query object. Objects that are "similar" are returned from a database. Matching is not limited to exact matching. Generally, a distance function may be used to measure dissimilarity. Objects that are not dissimilar by more than a range threshold, or, are least dissimilar to the query, are then sought. The distance function measures the dissimilarity between objects. Thus, retrieving an object that is more similar is equivalent to retrieving an object that has a lesser distance.

An exemplary fingerprinting method and engine, as in step 25, converts an audio signal into a sequence of relevant features. In a first step, preprocessing, captured audio is digitized if necessary and converted to a specific format. Next, in framing, the signal is divided into frames of a determined size. The number of frames computed per second is the frame rate. Next, a linear transformation is applied to transform the set of frames to a new set of features, preferably one that reduces redundancy. By way of example and not limitation, Fast Fourier Transform (FFT), Discrete Cosine Transform (DCT), Haar Transform or Walsh-Hadamard Transform may be applied. Next, feature extraction is performed to reduce dimensionality and increase invariance to distortions. By way of example, with knowledge of the transduction stages of the human auditory system, more perceptually meaningful parameters may be extracted through a critical-band analysis of the spectrum. Mel-Frequency Cepstrum Coefficients (MFCC) may be used. A Spectral Flatness Measure (SFM), which estimates tone-like or noise-like quality for a band in the spectrum, may be used. Band representative vectors, an ordered list of indexes of bands with prominent tones (i.e. with peaks with significant amplitude), may be used. Energy of each band may be used. Other approaches from music information retrieval, which include features that have proved valid for comparing sounds: harmonicity, bandwidth, loudness, zero crossing rates, may also be used. These and other methods of characterizing the transformed content may be utilized. To better characterize temporal variations, high order time derivatives may added to a signal model. A low resolution quantization may also be applied to the features to gain robustness against distortions, normalize, ease hardware implementations, reduce the memory requirements and for convenience in subsequent parts of the system. The result of these initial steps is sequence of feature vectors calculated on a frame by frame basis. Next, the fingerprint is modeled, such as by summarizing the multidimensional vector sequences in a single vector. By way of example and not limitation, 16 filtered energies may correspond to 30 seconds of audio ending up with a signature of 512 bits. The signature along with information on the original audio format is sent to a server for identification. Illustratively, a vector may include the average zero crossing rate, the estimated beats per minute (BPM), an average spectrum and some more features to represent a piece of audio. This approach is computationally efficient and produces a very compact fingerprint. Fingerprints can also be sequences (traces, trajectories) of features. Assuming that features of a given audio item are similar, a compact representation may be generated by clustering feature vectors. The sequence of vectors is thus approximated by a much lower number of representative code vectors, e.g., a map or table.

Video fingerprinting entails capturing video, transforming the input video data into a transform domain (e.g Radon transform, Fourier Mellin Transform) that is invariant under geometric operations before extracting robust features from the domain. First, the input video is temporally down-sampled to a reference frame rate. One or more frames are downsampled to reference spatial resolution. A sub-image is cropped out from down sampled images. A low-pass filtering operation is performed on the frame to improve robustness of extracted features.

Video fingerprinting provides a small number of pertinent features from video clips, called fingerprints, and to identify a video query by measuring the distance between a query fingerprint and fingerprints in a database. Feature extraction for video fingerprinting may entail extracting global features and/or local features. Global features mean that the fingerprints come from the whole video frame. A color histogram may be used to represent each individual frame in a captured video. A Centroid of Gradient Orientation (CGO) may be calculated for each block, and then an M-dimensional vector of the centroids may be used as a fingerprint for a video frame. Global features may be extracted from spatial domain, and/or the transform domain. For example a multi dimensional compact Fourier-Mellin transform (CFMT) signature may be extracted for each keyframe, and matrix may be formed as a final fingerprint for the keyframes. In contrast to considering global features, local features focus on the local structure of video frame. Local features can cope with resealing, cropping, adding logos and picture-in-picture, etc. As one example, a Harris interest point detector may be used to extract interest points in each keyframe, and a differential feature of the local region around each interest point may then used as the fingerprint. Extracting features not only spatially but also over time makes the fingerprints more discriminative as well as better localized. Illustratively, a spatial-temporal interest points detector may detect interest points. Local fingerprints are extracted by computing a contrast context histogram in local regions around each interest point which is to evaluate the intensity differences between the center pixel and the other pixels.

As one example, an input video clip may be converted to grayscale and resized to fixed width and height values. Then, local regions are detected in the resized video clip using a spatio-temporal interest point detector. Then, the input video clip is resampled at a fixed frame rate. Then, a local region is selected in each down-sampled frame according to the characteristic strength and scale of the interest point, and then a contrast content histogram is calculated in each selected local region. After normalizing each contrast content histogram to a set of unit vector, the unit vectors may be used as local fingerprints to represent the input video clip. During a video trigger, a television may be detected using image recognition technology. Once detected, the technology may crop the television edges and begin recording the video within the cropped edges of the television and create a Percipient Sample Pack (PSP), captured media, to send to the Media Information Module (MIM) and then the Virtual Repository Matching Module (VRM). A fingerprint or a watermark may also be created or digitized by the detection of color patterns, item patterns, shadows, brightness, contrast, speed of changes, speed of scene changes, speed of camera changes, wavelengths, frequencies, distance between the participants or objects all from the captured media or program from a video trigger and/or captured media by the user. Fingerprint and watermarks can be created or digitized using a combination from one or more detections from the video recording or captured media.

The MIM sends the user identification and program information to a Virtual Repository Matching Module (VRM), where a video or audio fingerprint is then made available for searching in step 30. The objective is to search the fingerprint database to find a match, a match between the fingerprint for the captured media and a fingerprint stored in the database for a segment of a program. Any searching technique suitable for comparing or determining a distance metric between the fingerprint and a large number of reference fingerprints may be used. Distances may be computed between the feature sequence extracted from the captured audio and reference audio fingerprints stored in a repository using a distance or scoring metric. The most likely reference in the database is selected. In some cases, the system may detect more than one match or reference sent over in the Percipient Sample Pack (PSP) and list them for the user on their portable computer device. The user will then select the program they are watching at the current moment to see the users, items, and/or services associated to the captured media. To efficiently complete comparisons of the fingerprint for a captured audio against possibly millions of fingerprints one or more techniques may be applied to identify the most likely reference audio fingerprints. For example, an index of certain pieces of a fingerprint may be used to generate a list of candidate reference audio fingerprints, which may then be efficiently exhaustively searched. Heuristics similar to those used in computational biology for the comparison of DNA may be used to speed up a search in the system where the fingerprints are sequences of symbols or values.

After a program and a segment of the program is identified, another database is searched to determine participants (e.g., actors, hosts, guests, producers) or item records, particularly those associated with the captured portion, as in step 35. The participant and/or item database, which may be stored locally 170 or accessed remotely, relates participants to programs and to scenes. After the participants are identified, the virtual repository may be queried.

In step 40, the VRM searches a database or other repository for records of participants, i.e., virtual repository users (e.g., individuals or items that appeared in the captured media and others associated with the captured media) associated with the identified program, and, in particular, with the portion of the program that contains the captured media. The user accounts of the identified users are then searched to identify shared records of items that appeared in the captured media. Thus, for example, records for an actor's attire worn in the scene, or for an accessory or object used in the scene and identified in a production company's virtual repository, may be identified.

In step 45, a hierarchical linked list is then made accessible for display on the portable computing device of the consumer who selected the trigger. The list may include a first page that displays links to each participant-user who has an account in the virtual repository. Such users may include acting professionals, news professionals, hosts, guests, and management (e.g., a producer) of a program for which the media was captured. Selecting link for such a user leads to linked information for item records associated with scene corresponding to the captured media. The item records are records of items that are in the user's virtual repository and are associated with the program, and, in particular, the portion of the program for the captured media. The items may also be linked. Selecting a link for an item may lead to additional information for the item including purchasing information. By way of example, the link may lead to a site for purchasing the item. In some examples, through the site a consumer may purchase or bid in an auction to purchase the authentic item used in the program, which may come with a certificate of authenticity such as a printed certificate, electronic certificate or a non-fungible token (NFT), i.e., a unique digital identifier that cannot be copied, substituted, or subdivided, that is recorded in a blockchain, and is used to certify authenticity and ownership. Alternatively, the link may lead to a retail site through which such an item may be purchased. Thus, the trigger leads to items of interest used in the scene for which the trigger was activated. The items or services on the scene or captured media of the program from the second user's virtual repository is activated when the first user's portable computer device is triggered and activated. The items and services from the second user's virtual repository will then be sent to the first user's portable computer device and listed and displayed for product detail information including a purchasing and action bidding option.

Through an affiliate program, a user may earn compensation (e.g., a commission) for each item purchased through such a link. In this manner, consumers are efficiently provided links to purchase items of interest that appear in a program, while actors, production companies and others associated with a program are compensated for garnering consumer interest and facilitating sales of the items, all without any explicit marketing and without any direct communication between the consumer and user.

In sum, in one exemplary implementation, a computer-implemented method of object linking from captured media entails, on a portable computing device, creating a pack including captured media, and sending the pack to a media identification module. Through the media identification module, a first fingerprint is generated for the captured media, the first fingerprint being unique to the captured media. Fingerprint generation may, optionally, entail transforming the captured media into a transform domain. Through a remote computing system, a fingerprint database configured to relate predetermined fingerprints to a plurality of programs is accessed. A plurality of predetermined fingerprints relates to each program of the plurality of programs. Through the remote computing system, a search is performed for a matching fingerprint among the predetermined fingerprints. A distance between the matching fingerprint and the first fingerprint is less than the distance between the first fingerprint and any other predetermined fingerprint of the fingerprint database. From the plurality of programs, a matching program and program scene related to the matching fingerprint is identified. Through the remote computing system, a participant and product database are accessed. The participant and product database relates participant and item records to programs and scenes. A search is performed for a matching participant, the matching participant being a participant record related to the matching program and scene. Through the remote computing system, a virtual repository is accessed. The virtual repository is a database that relates user records to object records and relates object records to program records. A search is performed for a matching user. The matching user is the user record for the matching participant. Matching objects are identified. The matching objects are object records related to the matching user and related to the matching program. A link to each matching object is sent to the portable computing device, and may include a link to an online retailer for each matching object to the portable computing device. A non-fungible token may be associated with at least one matching object, as a certificate of authenticity, which may be important if an authentic object is acquired.

In another embodiment a watermark is embedded into the captured media. The watermark may be a sound imperceptible to humans. The sound may be modulated to encode data. Through the media identification module, the watermark may be demodulated. Then the demodulated watermark may be searched in a watermark database that relates watermarks to programs and/or scenes of programs. If the program and scene are identified using this method, then fingerprinting may be unnecessary, but may optionally be carried out for confirmation.

The invention improves the functioning of a computer by providing means to automatically connect trigger information, including captured media, with object records for objects that may then be the subject of further transactions. This is an improvement in the computing and content delivery (e.g., broadcasting, streaming, movie theater) fields that did not heretofore exist. The invention is achieved by implementing sequential MIM/VRM operations to connect object records to captured media. The sequential MIM/VRM detects and demodulates any embedded watermark, fingerprints the captured audio or video for matching in a database of fingerprints for scenes (portions) of programs, identifies participants for the scene from a database that relates participants such as actors and producers to programs and scenes of the program, and identifies object records associated with the program or scene from the participants' virtual repository accounts. The selection of a trigger control captures media (audio and/or video), as part of a PSP, which effects a transformation, namely the identification of object records, from the PSP, for further transactions. Heretofore, no such automated means of connecting object records to a scene associated with the captured media existed. The object records enable linking for useful purposes.

The various databases described herein may comprise distinct separate databases, may be combined into one or more databases, or may comprise parts of larger databases. Thus, by way of example and not limitation, a participant database may be combined with a virtual repository. Similarly, a watermark database and fingerprint database may be combined into a multi-purpose database. Thus a database should not be construed to be limited to a distinct separate database, but, rather, may include any database that includes tables and relationships required to provide the described functionality.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts and/or steps have been described, the order may be modified in other implementations consistent with principles of the invention. Further, non-dependent acts may be performed in parallel. Still further although implementations described above discuss use of facial and voice biometrics, other biometric information (e.g., fingerprints, eye retinas and irises, hand measurements, handwriting, gait patterns, typing patterns, etc.) may be used to identify people and provide corresponding virtual repository information.

The term "comprises/comprising" when used in this specification is taken to specify the presence of stated features, steps or components but does not preclude the presence or addition of one or more other features, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, step, or instruction referenced in this application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A computer-implemented method of automated object linking from captured media, the method comprising:

on a computing device, creating a pack including recorded media, and sending the pack to a remote computing system;

through the remote computing system, generating a first fingerprint for the recorded media, the first fingerprint being unique to the recorded media;

through the remote computing system, accessing a database configured to relate predetermined fingerprints to a plurality of programs, a plurality of predetermined fingerprints relating to each program of the plurality of programs;

through the remote computing system, searching for a matching fingerprint among the predetermined fingerprints, a distance between the matching fingerprint and the first fingerprint being less than the distance between the first fingerprint and any other predetermined fingerprint of the fingerprint database, and, from the plurality of programs, identifying a matching program related to the matching fingerprint;

through the remote computing system, accessing a database that relates participant records to programs, and searching for a matching participant, the matching participant being a participant record related to the matching program;

through the remote computing system, accessing stored data that relates user records to object records and relates object records to program records, and searching for a matching user, the matching user being the user record for the matching participant, and identifying matching objects, the matching objects being object records related to the matching user and related to the matching program; and sending a link to each matching object to the computing device.

2. The computer-implemented method of automated object linking from recorded media of claim 1, further comprising, through the remote computing system, demodulating a watermark from the recorded media.

3. The computer-implemented method of automated object linking from recorded media of claim 2, further comprising through the remote computing system, accessing a watermark database configured to relate determined watermarks to a plurality of programs, each determined watermark relating to one program of the plurality of programs; and through the remote computing system, searching among the determined watermarks for a matching watermark, the matching watermark being equivalent to the demodulated watermark, and identifying the one program related to the matching watermark.

4. The computer-implemented method of automated object linking from recorded media of claim 1, the step of generating a first fingerprint comprising transforming the recorded media into a transform domain.

5. The computer-implemented method of automated object linking from recorded media of claim 1, wherein the step of sending a link to each matching object to the computing device further comprises sending a link to an online retailer for each matching object to the computing device.

6. The computer-implemented method of automated object linking from recorded media of claim 1, further comprising associating a non-fungible token with at least one matching object.

7. The computer-implemented method of automated object linking from recorded media of claim 1, wherein the step of identifying a matching program related to the matching fingerprint further comprises identifying a matching scene of a matching program related to the matching fingerprint.

8. The computer-implemented method of automated object linking from recorded media of claim 1, wherein the matching participant being a participant record related to the matching program and the matching scene.

9. A computer-implemented method of automated object linking from recorded media, the method comprising:
- on a computing device, creating a pack including recorded media, and sending the pack to a remote computing system;
- through the remote computing system, determining the recorded media includes a watermark, and if the recorded media does not include a watermark, generating a first fingerprint for the recorded media, the first fingerprint being unique to the recorded media;
- through a remote computing system, accessing a database configured to relate predetermined fingerprints to a plurality of programs, a plurality of predetermined fingerprints relating to each program of the plurality of programs;
- through the remote computing system, searching for a matching fingerprint among the predetermined fingerprints, a distance between the matching fingerprint and the first fingerprint being less than the distance between the first fingerprint and any other predetermined fingerprint of the fingerprint database, and, from the plurality of programs, identifying a matching program related to the matching fingerprint;
- through the remote computing system, accessing a database that relates participant records to programs, and searching for a matching participant, the matching participant being a participant record related to the matching program;
- through the remote computing system, accessing stored data that relates user records to object records and relates object records to program records, and searching for a matching user, the matching user being the user record for the matching participant, and identifying matching objects, the matching objects being object records related to the matching user and related to the matching program; and
- sending a link to each matching object to the computing device.

10. The computer-implemented method of automated object linking from recorded media of claim 1, further comprising, through the remote computing system, if the recorded media includes a watermark, demodulating the watermark from the recorded media.

11. The computer-implemented method of automated object linking from recorded media of claim 10, further comprising through the remote computing system, accessing a watermark database configured to relate determined watermarks to a plurality of programs, each determined watermark relating to one program of the plurality of programs; and
- through the remote computing system, searching among the determined watermarks for a matching watermark, the matching watermark being equivalent to the demodulated watermark, and identifying the one program related to the matching watermark.

12. The computer-implemented method of automated object linking from recorded media of claim 9, the step of generating a first fingerprint comprising transforming the recorded media into a transform domain.

13. The computer-implemented method of automated object linking from recorded media of claim 9, wherein the step of sending a link to each matching object to the computing device further comprises sending a link to an online retailer for each matching object to the computing device.

14. The computer-implemented method of automated object linking from recorded media of claim 9, further comprising associating a non-fungible token with at least one matching object.

15. The computer-implemented method of automated object linking from recorded media of claim 9, wherein the step of identifying a matching program related to the matching fingerprint further comprises identifying a matching scene of a matching program related to the matching fingerprint.

16. The computer-implemented method of automated object linking from recorded media of claim 9, wherein the matching participant being a participant record related to the matching program and the matching scene.

17. A computer-implemented method of automated object linking from recorded media, the method comprising:
- on a computing device, creating a pack including recorded media, and sending the pack to a remote computing system;
- through the remote computing system, determining if the recorded media includes a watermark, and if the recorded media includes a watermark, then demodulating the watermark from the recorded media, and if the recorded media does not include a watermark, then generating a first fingerprint for the recorded media, the first fingerprint being unique to the recorded media;
- through a remote computing system, if the recorded media does not include a watermark, accessing a database configured to relate predetermined fingerprints to a plurality of programs, a plurality of predetermined fingerprints relating to each program of the plurality of programs;
- through the remote computing system, if the recorded media does not include a watermark, searching for a matching fingerprint among the predetermined fingerprints, a distance between the matching fingerprint and the first fingerprint being less than the distance between the first fingerprint and any other predetermined fingerprint of the database configured to relate predetermined fingerprints to a plurality of programs, and, from the plurality of programs, identifying a matching program related to the matching fingerprint;
- through the remote computing system, if the recorded media includes a watermark, accessing a database configured to relate determined watermarks to a plurality of programs, each determined watermark relating to one program of the plurality of programs, and through the remote computing system, searching among the determined watermarks for a matching watermark, the matching watermark being equivalent to the demodulated watermark, and identifying the one program related to the matching watermark
- through the remote computing system, accessing a database that relates participant records to programs, and searching for a matching participant, the matching participant being a participant record related to the matching program;
- through the remote computing system, accessing a virtual repository that relates user records to object records and relates object records to program records, and searching for a matching user, the matching user being the user record for the matching participant, and identifying matching objects, the matching objects being object records related to the matching user and related to the matching program; and sending a link to each matching object to the computing device.

18. The computer-implemented method of automated object linking from recorded media of claim 17, the step of generating a first fingerprint comprising transforming the recorded media into a transform domain.

19. The computer-implemented method of automated object linking from recorded media of claim 17, wherein the step of sending a link to each matching object to the computing device further comprises sending, to the computing device, a link to a transaction site consisting of at least one of an online retail site for each matching object and a bidding site for auctioning an authentic matching item.

20. The computer-implemented method of automated object linking from recorded media of claim 17, wherein the step of identifying a matching program related to the matching fingerprint further comprises identifying a matching scene of a matching program related to the matching fingerprint, and the matching participant being a participant record related to the matching program and the matching scene.

* * * * *